US012713321B2

(12) United States Patent
Xu et al.

(10) Patent No.: US 12,713,321 B2
(45) Date of Patent: Aug. 18, 2026

(54) METHOD AND APPARATUS FOR SUPPORTING SELF-OPTIMISATION IN A WIRELESS COMMUNICATION SYSTEM

(71) Applicant: SAMSUNG ELECTRONICS CO., LTD., Suwon-si (KR)

(72) Inventors: Lixiang Xu, Beijing (CN); Xiaoning Ma, Beijing (CN); Hong Wang, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 18/639,828

(22) Filed: Apr. 18, 2024

(65) Prior Publication Data

US 2024/0267821 A1 Aug. 8, 2024

Related U.S. Application Data

(63) Continuation of application No. 17/931,939, filed on Sep. 14, 2022, now Pat. No. 11,968,585, which is a (Continued)

(30) Foreign Application Priority Data

Nov. 8, 2019 (CN) ......................... 201911089876.7
Feb. 13, 2020 (CN) ......................... 202010091347.7
Apr. 9, 2020 (CN) ......................... 202010276154.9

(51) Int. Cl.
*H04W 36/30* (2009.01)
*H04W 24/10* (2009.01)
(Continued)

(52) U.S. Cl.
CPC ......... *H04W 36/305* (2018.08); *H04W 24/10* (2013.01); *H04W 36/08* (2013.01); *H04W 36/14* (2013.01)

(58) Field of Classification Search
CPC ... H04W 36/305; H04W 24/10; H04W 36/08; H04W 36/14; H04W 24/02; H04W 48/18;
(Continued)

(56) References Cited

U.S. PATENT DOCUMENTS

2013/0260745 A1* 10/2013 Johansson ........... H04W 36/144 455/423
2014/0133465 A1* 5/2014 Johansson ......... H04W 36/0085 370/332
(Continued)

FOREIGN PATENT DOCUMENTS

CN 103856980 A 6/2014
WO 2011131221 A1 10/2011
WO 2015112073 A1 7/2015

OTHER PUBLICATIONS

International Search Report and Written Opinion of the International Searching Authority dated Feb. 9, 2021 in connection with International Application No. PCT/KR2020/015499, 9 pages.
(Continued)

*Primary Examiner* — Ankur Jain

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method for supporting self-configuration and self-optimization in a wireless communication system.

20 Claims, 10 Drawing Sheets

Related U.S. Application Data continuation of application No. 17/090,810, filed on Nov. 5, 2020, now Pat. No. 11,483,753.

(51) Int. Cl.
*H04W 36/08* (2009.01)
*H04W 36/14* (2009.01)

(58) Field of Classification Search
CPC . H04W 88/06; H04W 36/0058; H04W 88/08; H04W 92/20
See application file for complete search history.

(56) References Cited

U.S. PATENT DOCUMENTS

| | | | | |
|---|---|---|---|---|
| 2014/0179325 | A1* | 6/2014 | Xu | H04W 76/19 455/437 |
| 2015/0140999 | A1* | 5/2015 | Zhang | H04W 76/19 455/424 |
| 2015/0208295 | A1* | 7/2015 | da Silva | H04W 76/18 370/221 |
| 2015/0312813 | A1* | 10/2015 | Xu | H04W 76/18 455/438 |
| 2016/0285679 | A1* | 9/2016 | Dudda | H04W 36/0058 |
| 2017/0230878 | A1 | 8/2017 | Johansson et al. | |
| 2018/0132303 | A1 | 5/2018 | Xu et al. | |
| 2019/0082363 | A1* | 3/2019 | Park | H04W 24/10 |
| 2019/0215756 | A1* | 7/2019 | Park | H04W 36/305 |
| 2019/0313273 | A1* | 10/2019 | Sharma | H04W 8/08 |
| 2020/0154333 | A1* | 5/2020 | Paladugu | H04B 7/0452 |
| 2021/0176692 | A1* | 6/2021 | Rugeland | H04W 76/19 |

OTHER PUBLICATIONS

Huawei et al., "Discussion on RLF reporting for inter-RAT case," R2-1910993, 3GPP TSG-RAN WG2 Meeting#107, Prague, Czech Republic, Aug. 26-30, 2019, 3 pages.
Office Action dated Sep. 15, 2021, in connection with Korean Application No. 10-2020-0147760, 9 pages.
3GPP TS 36.331 V15.7.0 (Sep. 2019), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Sep. 2019, 945 pages.
Qualcomm Incorporated, "Mobility Robustness Optimisation Scenarios and Procedures," R3-191311, 3GPP TSG-RAN WG3 Meeting #103bis, Xi"an, China, Apr. 8-12, 2019, 6 pages.
Korean Intellectual Property Office, "Decision of Patent," issued Mar. 25, 2022, in connection with Korean Patent Application No. 10-2020-0147760, 4 pages.
3GPP TS 36.423 V13.3.0 (Mar. 2016) Technical Specification; 3rd Generation Partnership Project; Technical Specification Group Radio Access Network; Evolved Universal Terrestrial Radio Access Network (E-UTRAN); X2 application protocol (X2AP) (Release 13); 230 pages.
Samsung Electronics, "Introduction of RLF report in SA", 3GPP TSG-RAN WG2 #103, Aug. 20-24, 2018, R2-1812698, 20 pages.
Samsung, "Inter-RAT RLF reporting for MRO", 3GPP TSG-RAN WG2 Meeting #109-e, R2-2001444, 9 pages.
Supplementary European Search Report dated Oct. 27, 2022 in connection with European Patent Application No. 20 88 4304, 14 pages.
Examination Report issued Feb. 5, 2024, in connection with Indian Patent Application No. 202237025977, 6 pages.
Office Action dated Aug. 11, 2025, in connection with Chinese Application No. 202010276154.9, 30 pages.
Office Action dated May 6, 2025, in connection with Chinese Application No. 202010276154.9, 22 pages.
Office Action issued Sep. 13, 2024, in connection with Chinese Patent Application No. 202010276154.9, 24 pages.
Hearing Notice issued Oct. 4, 2024, in connection with Indian Patent Application No. 202237025977, 3 pages.
Communication pursuant to Article 94(3) EPC dated Jun. 6, 2024, in connection with European Patent Application No. 20884304.5, 9 pages.
Office Action dated Dec. 24, 2025, in connection with Chinese Application No. 202010276154.9, 31 pages.

* cited by examiner

FIG. 1

METHOD AND APPARATUS FOR SUPPORTING SELF-OPTIMISATION IN A WIRELESS COMMUNICATION SYSTEM

CROSS-REFERENCE TO RELATED APPLICATIONS

This application is a continuation of application Ser. No. 17/931,939, filed on Sep. 14, 2022, which is a continuation of application Ser. No. 17/090,810, now U.S. Pat. No. 11,483,753, issued on Oct. 25, 2022, which is based on and claims priority to Chinese Patent Application No. 201911089876.7 filed on Nov. 8, 2019, Chinese Patent Application No. 202010091347.7 filed on Feb. 13, 2020, and Chinese Patent Application No. 202010276154.9 filed on Apr. 9, 2020, the disclosures of which are herein incorporated by reference in their entirety.

BACKGROUND

1. Field

The present disclosure relates to a wireless communication technology, and in particular, to a method and a device for supporting self-configuration and self-optimization.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communication increasingly tends to provide a user with multimedia services which are transmitted at a high rate. As shown in FIG. 1, it is a system architecture diagram of system architecture evolution (SAE).

A user equipment (UE) 101 is a terminal device used to receive data. Evolved universal terrestrial radio access network (E-UTRAN) 102 is a radio access network in which a macro base station (eNodeB/NodeB) for providing the UE with an interface for access to the radio network is included. A mobility management entity (MME) 103 is responsible for managing a mobility context, a session context and security information of the UE. A service gateway (SGW) 104 mainly provides a function of a user plane, and the MME 103 and the SGW 104 may be within the same physical entity. A packet data network gateway (PGW) 105 performs functions such as charging, lawful interception and the like, and the PGW and the SGW 104 may be within the same physical entity. A policy and charging rules function entity (PCRF) 106 provides quality-of-service (QoS) policies and charging criteria. A general packet radio service support node (SGSN) 108 is a network node device for providing routing for data transmission in a universal mobile telecommunications system (UMTS). A home subscriber server (HSS) 109 is the UE's home subsystem and is responsible for protecting user information including a current location of the user equipment, an address of the service node, user security information, a packet data context of the user equipment, and the like.

As shown in FIG. 2, it is a system architecture diagram of a next-generation network or a fifth-generation (5G) network.

A user equipment (UE) 201 is a terminal device used to receive data. A next generation-Radio Access Network (NG-RAN) 202 is a radio access network in which a base station (a gNB or an eNB connected to the 5G Core network (5GC), the eNB connected to the 5GC being also called ng-gNB) for providing the UE with an interface for access to the radio network is included. An access and mobility management function entity (AMF) 203 is responsible for managing mobility context and security information of the UE. A user plane function entity (UPF) 204 mainly provides a function of a user plane. A session management function entity (SMF) 205 is responsible for session management. A data network (DN) 206 includes, for example, operator's services, Internet access, third-party services, and the like.

Support for mobility robustness self-optimisation (MRO) in the 5G system begin to be discussed in release 16. The MRO includes intra-system mobility robustness self-optimisation and inter-system mobility robustness self-optimisation (such as mobility robustness self-optimisation in movement or handover between 5G system and 4G system). Currently, the intra-system mobility robustness self-optimisation procedure may be performed based on a radio resource control (RRC) connection re-establishment request message or based on a radio link failure (RLF) report of the UE. For the method performed based on the RLF report the UE, it is currently performed according to the following steps: a UE fails due to a radio link failure or a handover failure; the UE reconnects to a cell, and the UE indicates, to the newly accessed base station, the RLF report is available; the base station requests the UE to report the UE RLF report; after receiving the UE RLF report, the base station knows, from the RLF report, the cell identity of the cell that last serves the UE prior to the failure; the base station transmits the UE RLF report to the base station which controls the cell that last serves the UE prior to the failure; the base station which controls the cell that last serves the UE prior to the failure determines the cause of the failure occurring, such as too early handover, too late handover, or handover to wrong cell; if it is the too early handover or the handover to wrong cell, the base station which controls the cell that last serves the UE prior to the failure transmits the handover report to the base station that triggers the too early handover or the handover to wrong cell.

SUMMARY

For the 5G intra-system handover, there are the intra-radio access technology (RAT) handover and the inter-RAT handover. Whether the above mechanism may be applied to the intra-system inter-RAT has not been discussed in detail.

The present disclosure provides several mechanisms for supporting the inter-RAT MRO in order to address the problem about mobility robustness when a UE moves or handovers between different RATs.

According to an aspect of the present disclosure, there is provided a method performed by a terminal in a wireless communication system, and the method includes: storing information on a connection failure, in case that the connection failure in a cell of a first base station related to a first radio access technology (RAT) is detected; establishing a connection with a second base station related to a second RAT; receiving, from the second base station, a request message including information for indicating the terminal to report the information on the connection failure; and transmitting, to the second base station, a response message including the information on the connection failure to be transferred to the first base station, based on the request message.

According to another aspect of the present disclosure, there is provided a method performed by a second base station related to a second radio access technology (RAT) in a wireless communication system, and the method includes: establishing a connection with a terminal; transmitting, to the terminal, a request message including information for indicating the terminal to report information on a connection failure; receiving, from the terminal, a response message including the information on the connection failure in a cell of a first base station related to a first RAT, based on the request message; and transferring the information on the connection failure to the first base station.

According to another aspect of the present disclosure, there is provided a terminal in a wireless communication system, and the terminal includes: a transceiver; and a controller operably connected to the transceiver, the controller configured to: store information on a connection failure, in case that the connection failure in a cell of a first base station related to a first radio access technology (RAT) is detected, establish a connection with a second base station related to a second RAT, receive, from the second base station via the transceiver, a request message including information for indicating the terminal to report the information on the connection failure, and transmit, to the second base station via the transceiver, a response message including the information on the connection failure to be transferred to the first base station, based on the request message.

According to another aspect of the present disclosure, there is provided a second base station related to a second radio access technology (RAT) in a wireless communication system, and the second base station includes: a transceiver; and a controller operably connected to the transceiver, the controller configured to: establish a connection with a terminal; transmit, to the terminal via the transceiver, a request message including information for indicating the terminal to report information on a connection failure, receive, from the terminal via the transceiver, a response message including the information on the connection failure in a cell of a first base station related to a first RAT, based on the request message, and transfer the information on the connection failure to the first base station.

According to another aspect of the present disclosure, there is provided a method for supporting self-configuration and self-optimisation, and the method includes steps as follows.

A failure occurs for the UE in cell A of a base station 1;

The UE re-establishes the RRC connection in a cell of a base station 2. In the RRC connection establishment completion or RRC connection re-establishment completion message, the UE indicates to the network the RLF report information is available.

The base station 2 requests the UE to report the RLF report, and the UE transmits the UE RLF report to the base station 2. For the UE, in the message for transmitting the UE RLF report (outside the UE RLF report container), the cell identity of the last cell that served the UE prior to the failure occurred is also included and/or TAC or TAI for this cell. Each of the above cell identities may be a global cell identity or a PCI and frequency information.

The base station 2 transmits a failure indication message to the base station 1. The failure indication message includes the RLF report received from the UE.

The base station 1 detects the cause of the failure;

For too early handover or handover to wrong cell, the base station 1 transmits a handover report message to the base station which controls the source cell that triggers the last handover.

This method may enable the network to correctly detect the cause of the failure in the case that the UE fails when moving between different RATs, while reducing the time for the UE to store RLF report information and reducing the process on the base station side, that is, the NR base station does not need to decode (or parse) the content of the LTE RRC and the LTE base station does not need to parse the content of the NR RRC.

According to another aspect of the present disclosure, there is provided another method for supporting self-configuration and self-optimisation, and the method includes steps as follows:

A UE fails in a cell of a base station 1

The UE re-establishes the RRC connection in a cell of a base station 2 of a different radio access type from that of the base station 1.

The UE is connected to the base station 3 of the same radio access type as that of the base station 1. In the RRC connection establishment completion or RRC connection re-establishment completion or RRC reconfiguration completion message, the UE indicates to the network the RLF report information is available.

The base station 3 requests the UE to report the RLF report, and the UE transmits the ULE RLF report to the base station 3. The RLF report includes cell identity of cell where the UE successfully establishes the RRC connection or cell identity of cell where the UE attempts to establish the RRC connection, after the failure; the time elapsed from the failure to the RRC reconnection attempt the or the successful access to the network.

The base station 3 transmits a failure indication message to the base station 1. The failure indication message includes the RLF report received from the UE.

The base station 1 checks the cause of the failure occurring.

For too early handover or handover to wrong cell, the base station 1 transmits a handover report message to the base station which controls the source cell that triggers the last handover.

TECHNICAL EFFECT

From the description of the method for supporting self-configuration and self-optimisation of the present disclosure, the method enables the network to correctly detect the cause of the failure in the case that the UE fails when moving between different RATs, while reducing the time for the UE to store RLF report information and reducing the process on the base station side, that is, the NR base station does not need to decode the content of the LTE RRC and the LTE base station does not need to decode the content of the NR RRC. When there is no Xn interface between the base station which controls the cell where the failure occurs and the base station which controls the cell where the UE reconnects, the base station may still transmit the RLF report to the base station which controls the cell where the failure occurs through the core network without parsing the RLF of other radio access technologies. When there is no Xn interface between the base station which controls the cell where the failure occurs and the base station which controls the cell that triggers the last handover, the base station which controls the cell where the failure occurs may still transmit a handover report to the base station which controls the source cell that triggers the last handover.

This method may enable the network to correctly detect the cause of the failure in the case that the UE fails when moving between different RATs, while reducing the process on the base station side, that is, the NR base station does not need to decode the content of the LTE RRC and the LTE base station does not need to decode the content of the NR RRC.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Figure 1:
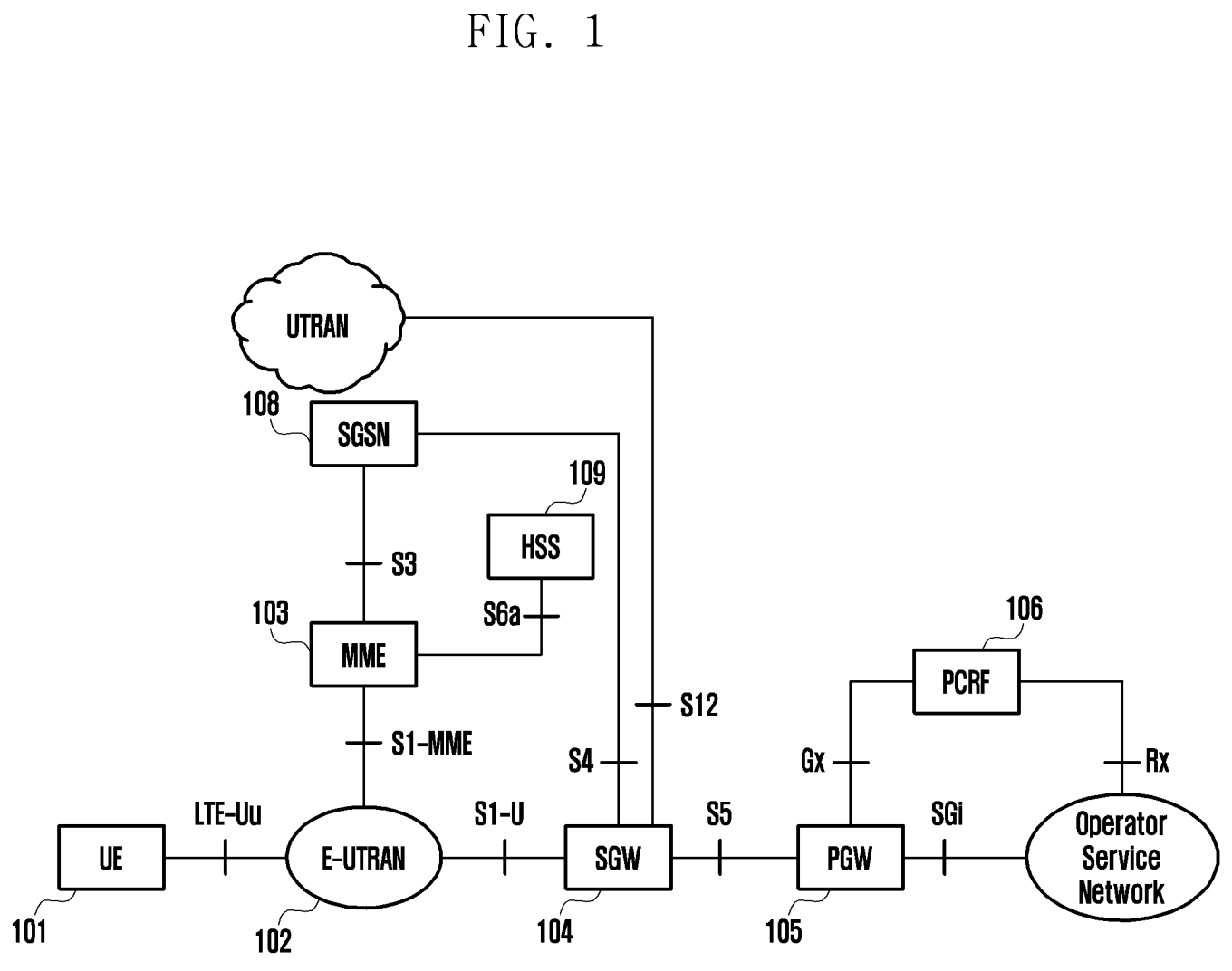

FIG. 1 is a system architecture diagram of system architecture evolution (SAE);

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The method for supporting self-configuration and self-optimisation provided by the present disclosure may address the problem about mobility robustness when a UE moves or handovers between different RATs, reduce the time for the UE to store the RLF report, and avoid the problem that base stations of different radio access technologies understand each other's RRC message, which ensures that failure events between different RATs are found timely so that the aim of self-configuration and self-optimisation is achieved.

Figure 2:
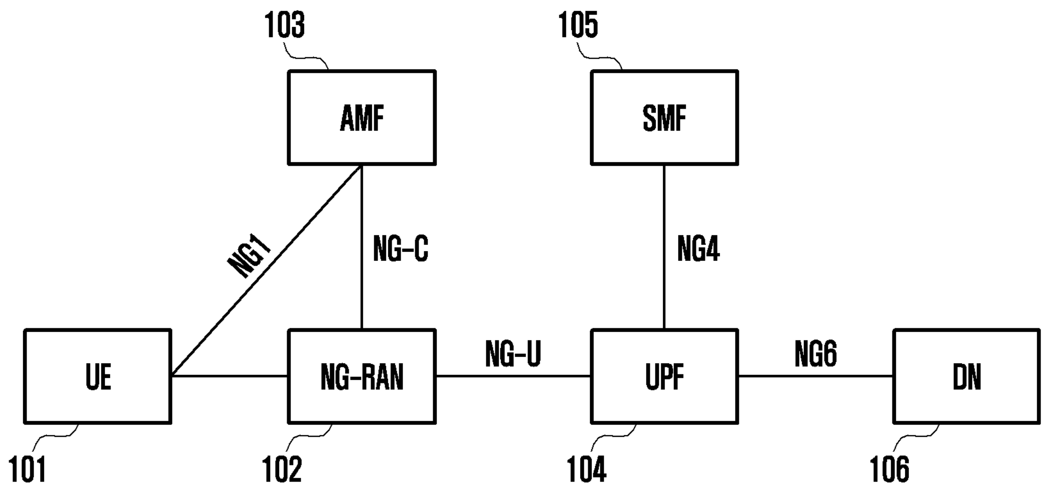
FIG. 2 is a schematic diagram of an initial overall architecture for the 5G technology.
Figure 3:
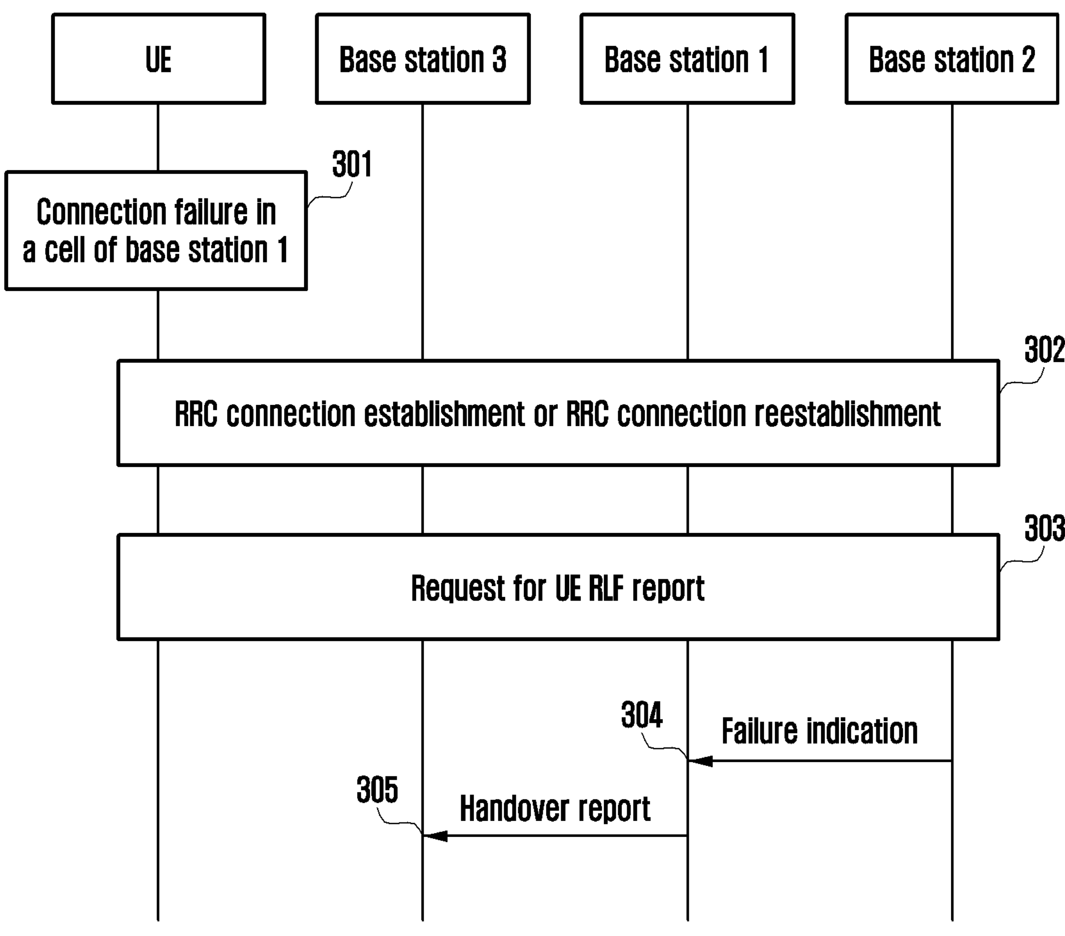
FIG. 3 illustrates a first method for supporting self-configuration and self-optimisation according to the present disclosure.

A first method for supporting self-configuration and self-optimisation according to the present disclosure is illustrated as FIG. 3. A detailed description of steps which are not related to the present disclosure is omitted here. In the method, base station 1 and base station 2 may be base stations of different radio access technologies. For example, the base station 1 is an ng-eNB or an eNB that supports the LTE air interface technology, and the base station 2 is a gNB that supports the NR radio access technology. Alternatively, the base station 1 is a gNB that supports the NR radio access technology, and the base station 2 is an ng-eNB or an eNB that supports the LTE air interface technology. The base station 3 may be a base station that supports any radio access technology, for example, the same radio access technology as that supported by the base station 1, the same radio access technology as that supported by the base station 2, or other radio access technologies. The method includes steps as follows.

Step 301: A UE fails in a cell of the base station 1, and it is assumed that the UE fails in the cell A. A failure here may be an RLF or a handover failure. For the handover failure, the cell A is a target cell for the handover. The cell where the failure occurs is also the cell that last serves the UE prior to the failure. The UE stores (or saves) one or more of the following information:

Cell identity of the cell A, which may be a global cell identity or a physical cell identifier (PCI) and frequency information;

Tracking area code (TAC) or tracking area identity (TAI) of the cell A;

Cell identity of the source cell that triggers the last handover;

TAC or TAI of the source cell that triggers the last handover;

Time elapsed from the beginning of the last handover to the failure;

Connection failure being an RLF or a handover failure;

Radio measurements of the UE;

C-RNTI allocated to the UE by the cell that last serves the UE prior to the failure;

Cause of triggering an RLF;

Cell identity of the cell where the UE attempts to re-establish the RRC connection, or cell identity of the cell where the UE attempts to establish the RRC connection, or cell identity of the cell where the UE establishes the RRC connection, after the failure;

Time elapsed from the failure to the UE RLF report.

The last two items may be stored (or saved) in a subsequent procedure. For example, when the UE attempts to re-establish the RRC connection, the UE records the cell identity of the cell where the UE attempts to re-establish the RRC connection after the failure. When the UE prepares to transmit the RLF report, the UE records the time elapsed from the failure to the UE RLF report.

All the above cell identities may be the global cell identity or the PCI and the frequency information.

The UE also stores the RLF report of which radio access technology the stored RLF report information is, such as an LTE RLF report or an NR RLF report.

If the base station 1 is an LTE base station (for example, an ng-eNB or an eNB), the above RLF report information is the LTE RLF report, which is in the format and encoding of the LTE RRC.

If the base station 1 is an NR base station (for example, a gNB), the above-mentioned RLF report information is the NR RLF report, which is in the format and encoding of the NR RRC.

Step 302: The UE re-establishes the RRC connection in a cell of the base station 2. The ULE may re-establish the RRC connection through the RRC connection establishment or RRC connection re-establishment procedure. In the RRC connection establishment completion or RRC connection re-establishment completion message, the UE indicates, to the network, that the RLF report information is available. The UE may indicate, to the network, that the RLF report information is available. The UE may also indicate, to the network, that the RLF report information of which radio access technology is available, for example, the UE indicates, to the network, that the LTE RLF report or the NR RLF report is available. The ULE may also indicate, to the network, the LTE RLF report and the NR RLF report are available.

The method of the present disclosure may further include the step of: broadcasting, by the base station, whether the base station supports the RLF information reporting, or broadcasting, by the base station, the RLF information reporting of which radio access technology the base station supports. For example, the LTE base station broadcasts whether the LTE base station supports the NR RLF information reporting and/or the LTE RLF information reporting, and the NR base station broadcasts whether the NR base station supports the LTE RLF information reporting and/or the NR RLF information reporting. If the base station with which the UE re-establishes the RRC connection supports the RLF information reporting, or supports the RLF information reporting of the corresponding radio access technology stored by the UE, the UE transmits, to the re-accessed base station, that the RLF information reporting or the RLF information reporting of which radio access technology is available. For example, the UE may indicate to the base station that the RLF information reporting to the base station is available, and the UE may also indicate that the NR RLF information reporting or the LTE RLF information reporting to the base station is available.

If the base station 2 is the NR base station gNB, and the TE stores the LTE RLF report, the UE indicates, to the base station 2, that the RLF report information is available, through the RRC connection establishment completion or RRC connection re-establishment completion message of the NR. The UE may indicate that the RLF report information is available to the base station 2 through the RRC connection establishment completion or RRC connection re-establishment completion message of the NR. The UE may also indicate, to the base station 2, the RLF report information of which radio access technology is available, for example, the UE indicates, to the base station 2, that the LTE RLF report or the NR RLF report is available. The UE may also indicate, to the base station 2, that the LTE RLF report and the NR RLF report are available.

If the base station 2 is the LTE base station ng-eNB or eNB, and the UE stores the NR RLF report, the UE indicates, to the base station 2, that the RLF report information is available, through the RRC connection establishment completion or RRC connection re-establishment completion message of the LTE. The UE may indicate that the RLF report information is available to the base station 2 through the RRC connection establishment completion or RRC connection re-establishment completion message of the LTE. The UE may also indicate, to the base station 2, the RLF report information of which radio access technology is available, for example, the UE indicates, to the base station 2, that the LTE RLF report or the NR RLF report is available. The UE may also indicate, to the base station 2, that the LTE RLF report and the NR RLF report are available.

Step 303: The base station 2 requests the UE to report the RLF report, and the UE transmits the UE RLF report to the base station 2.

The base station 2 may also indicate, to the UE, the RLF report of which radio access technology is requested. For example, the base station 2 requests the UE to report the LTE RLF report or the NR RLF report. The base station 2 may also request the UE to report the LTE RLF report and the NR RLF report. The base station 2 requests the UE to report the RLF report according to the RLF report being available or the RLF report of which radio access technology being available indicated by the UE in the RRC connection establishment completion or RRC connection re-establishment completion message. For example, if the UE indicates that the LTE RLF report is available, and the base station 2 supports the request for the LTE report, the base station 2 may request the UE to report the LTE RLF report. If the UE indicates that the NR RLF report is available, and the base station 2 supports the request for the NR report, the base station 2 may request the UE to report the NR RLF report.

Alternatively, the base station does not need to distinguish between the radio access technologies. The UE indicates that the RLF report is available, and then the base station requests the UE to report the RLF report.

The base station may request the UE RLF report through a UE information request message. The UE information request may include the RLF report of which radio access technology is requested, for example, the NR RLF report is requested or the LTE RLF report is requested.

The UE may transmit the RLF report to the base station through a UE information response message. The UE information response message includes the RLF report. The RLF report may be the LTE RLF report and/or the NR RLF report.

The UE RLF report includes the content described in step 301. In the UE RLF report, the cell identity of the cell that last serves the UE before the failure occurs may be included. In the message of transmitting the UE RLF report (outside the UE RLF report container), the cell identity of the cell that last serves the UE before the failure occurs is also included. The cell that last serves the UE prior to the failure is also the cell where the failure occurs. For the handover failure, the cell is a target cell in a target base station. All the cell identities may be the global cell identity or the PCI and frequency information. In the present embodiment, the cell is cell A.

In the UE RLF report, the TAC or TAI of the cell that last serves the UE before the failure occurs is included. In the message of transmitting the UE RLF report (outside the UE RLF report container), the TAC or TAI of the cell that last serves the UE before the failure occurs is also included. The cell that last serves the UE prior to the failure is also the cell where the failure occurs. For handover failure, the cell is the target cell in the target base station. In the present embodiment, the cell is cell A.

If the base station 1 is the LTE base station and the base station 2 is the NR base station, the UE make the LTE RLF report information be included in the NR RRC message, and make the cell identity of the cell that last serves the UE before the failure occurs and/or the TAC or TAI of the cell also be included in the NR RRC message (outside the LTE RLF report container) at the same time.

If the base station 1 is the NR base station and the base station 2 is the LTE base station, the UE make the NR RLF report information be included in the LTE RRC message, and the cell identity of the cell that last serves the UE before the failure occurs and/or the TAC or TAI of the cell also be included in the LTE RRC message (outside the NR RLF report container).

Step 304: The base station 2 knows the cell that last serves the UE prior to the failure according to the cell identity of the cell that last serves the UE before the failure occurs included in the RRC message. Here, the cell that last serves the UE prior to the failure is controlled by the base station 1. The base station 2 transmits a failure indication message to the base station 1. The failure indication message includes the RLF report received from the UE.

If there is no Xn interface between the base station 2 and the base station 1, the base station 2 needs to transmit the failure indication message to the base station 1 through the core network. The base station 2 knows the TAI of the cell of the base station 1 from the cell identity of the cell that last serves the UE before the failure occurs and the TAC or TAI of the cell included in the RRC message. The base station 2 transmits a message to the core network, and the message includes the UE RLF report and the TAI of the cell in which the failure occurs, The TAI is used for routing in the core network, for example, the TAI is used by core network entity 2 (such as AMF2 or MME2) to which the base station 2 is connected to find core network entity 1 (such as AMF1 or MME1) to which the base station 1 is connected. The base station 1 and the base station 2 may also be connected to the same core network entity. That is, the core network entity 1 and the core network entity 2 may be the same entity or different entities. The details are as described in the embodiments in FIGS. 6 and 7.

The base station 2 does not need to decode the RLF report container of the base station 1. This method may simplify the base station 2.

If the base station 1 is the LTE base station ng-eNB or eNB, and the base station 2 is the NR the base station gNB, the gNB does not need to decode the content of the LTE RLF report, and knows the cell that last serves the UE prior to the failure directly according to the cell identity of the cell that last serves the UE before the failure occurs included in the NR RRC message, and thus knows the base station which controls the cell, and transmits a failure indication message to the base station. The gNB may transmit a failure indication message to the base station which controls the cell that last serves the UE prior to the failure, without a support for implementing the RRC of the LTE. Similarly, in the case where there is no Xn interface between the base station 1 and the base station 2, the gNB does not need to decode the content of the LTE RLF report, and may know the TAI of the cell where the failure occurs directly from the NR RRC message, so as to transmit the RLF report to the base station 1 through the core network. Meanwhile, the UE does not need to wait to transmit the UE RLF report until the ULE reconnects to the LTE base station, which reduces the time for the UE to store the RLF report and stores the UE's memory space. Similarly, in the case where there is no Xn interface between the base station 1 and the base station 2, the gNB does not need to decode the content of the LTE RLF report, and may know the TAI of the cell where the failure occurs directly from the NR RRC message, so as to transmit the RLF report to the base station 1 through the core network.

If the base station 1 is the NR base station gNB, and the base station 2 is the LTE base station ng-eNB or eNB, the ng-eNB or the eNB does not need to decode the content of the NR RLF report, and knows the cell that last serves the UE prior to the failure directly according to the cell identity of the cell that last serves the UE before the failure occurs included in the LTE RRC message, and thus knows the base station which controls the cell, and transmits a failure indication message to the base station. The ng-eNB or the eNB may transmit a failure indication message to the base station which controls the cell that last serves the UE prior to the failure, without a support for implementing the RRC of the NR. Similarly, in the case where there is no Xn interface between the base station 1 and the base station 2, the ng-eNB or the eNB does not need to decode the content of the NR RLF report, and may know the TAI of the cell in which the failure occurs directly from the LTE RRC message, so as to transmit an RLF report to the base station 1 through the core network. Meanwhile, the UE does not need to wait to transmit the UE RLF report until the UE reconnects to the NR base station, which reduces the time for the UE to store the RLF report and stores the UE's memory space.

Step 305: The base station 1 detects the cause of the failure occurring, such as too early handover, too late handover, or handover to wrong cell. The base station 1 may detect the cause of the failure occurring according to the existing mechanism, and details are not described herein repeatedly.

For the too early handover or the handover to wrong cell, the base station 1 transmits a handover report message to the base station which controls the source cell that triggers the last handover, such as the base station 3. The base station 1 knows the identity of the source cell that triggers the last handover according to the UE RLF report. The handover report message includes the cell identity of the cell where the UE attempts to establish the RRC connection, or the UE establishes the RRC connection, after the failure. Optionally, the handover report message may include the cell identity of the target cell for the handover. If the base station 1 and the base station 3 belong to base stations supporting different radio access technologies, the handover report may not include the UE RLF report. The handover report message directly includes a combination of one or more of the following information:

Time elapsed from the beginning of the last handover to the failure;

Connection failure being an RLF or a handover failure;

Radio measurements of the UE;

C-RNTI allocated to the UE in the cell that last serves the UE prior to the failure;

Cause of triggering an RLF;

Cell identity of the cell where the UE attempts to re-establish the RRC connection, or the UE attempts to establish the RRC connection, or the UE establishes the RRC connection, after the failure;

Time elapsed from the failure to the UE RLF report;

Beam measurements of serving cell and neighboring cells, especially beam measurements related to the SSB/CSI-RS;

Uncompensated barometric measurement;

Information on speed and direction of the UE.

The base station 1 obtains the above information from the UE RLF report, and the base station 1 makes one or more of the above information included directly in the handover report message and sends the handover report message to the base station 3. The base station 1 may makes one or more of the above information included in the handover report message in the case where the base station 3 and the base station 1 support different radio access technologies. The meaning of the base station 1 making one or more of the above information included directly in the handover report message refers to including one or more of the above information in the application protocol message of Xn or X2 or NG or S1 or other network interface, rather than including one or more of the above information in the UE RLF report comprised in the network interface message, and its meaning applies as well in the following description.

In this way, the base station 3 may know more information about the failure without parsing the RRC information of other radio access technologies, i.e., without parsing the content in the RLF report of different radio access technologies, so as to confirm the cause of the failure and make reasonable parameter adjustments to avoid future failures.

So far, the description of the first method for supporting self-configuration and self-optimisation of the present disclosure is completed. This method may enable the network to correctly detect the cause of the failure in the case that the UE fails when moving between different RATs, while reducing the time for the UE to store RLF report information and reducing the process on the base station side, that is to say, the NR base station does not need to decode the content of the LTE RRC and the LTE base station does not need to decode the content of the NR RRC.

Figure 4:
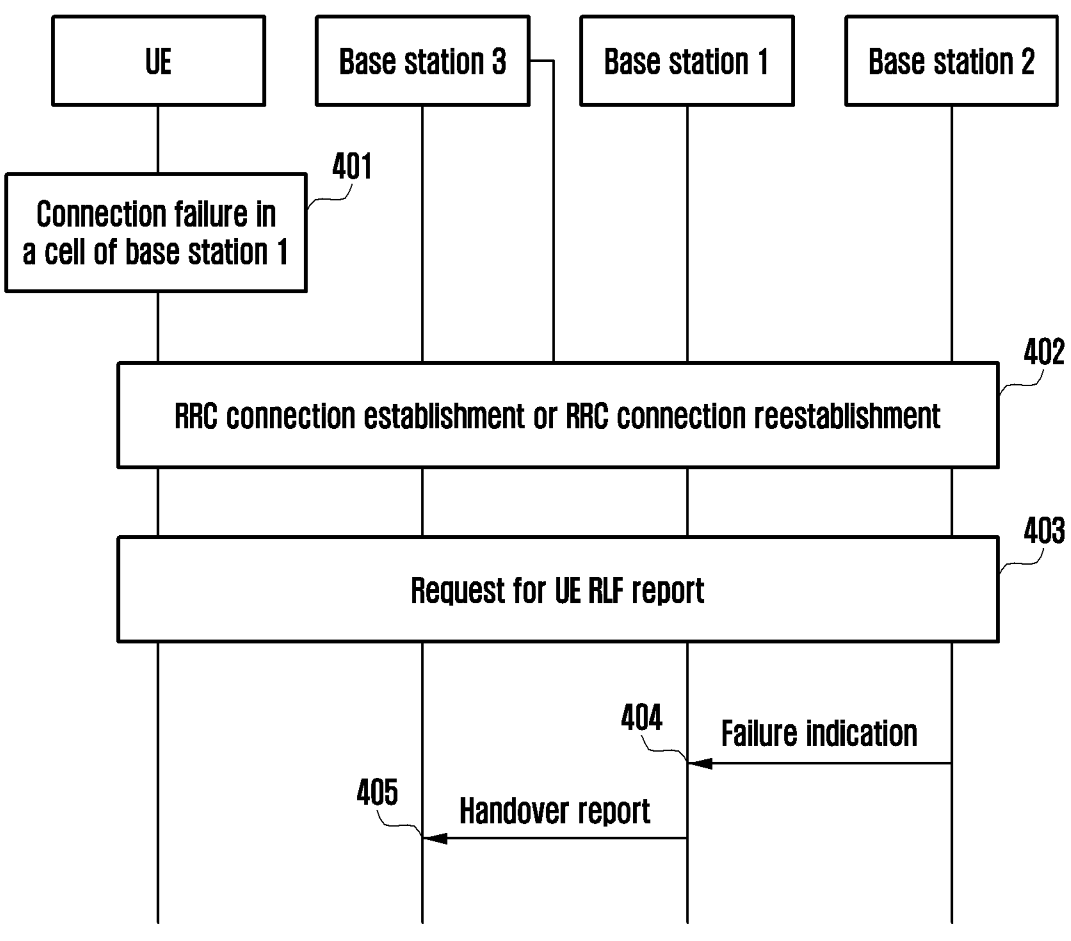
FIG. 4 illustrates a second method for supporting self-configuration and self-optimisation according to the present disclosure.

A second method for supporting self-configuration and self-optimisation according to the present disclosure is illustrated as FIG. 4. A detailed description of steps which are not related to the present disclosure is omitted here. In the method, base station 1 and base station 2 may be base stations of different radio access technologies, for example, the base station 1 is an ng-eNB or an eNB that supports an LTE air interface technology, and the base station 2 is a gNB that supports the NR radio access technology. Alternatively, the base station 1 is a gNB that supports the NR radio access technology, and the base station 2 is an ng-eNB or an eNB that supports the LTE air interface technology. The base station 3 may be a base station that supports any radio access technology, for example, the same radio access technology as that supported by the base station 1, the same radio access technology as that supported by the base station 2, or other radio access technologies. The method includes steps as follows.

Step 401: A UE fails in a cell of the base station 1, and it is assumed that the UE fails in the cell A. The failure here may be an RLF or a handover failure. For the handover failure, the cell A is a target cell for the handover. The cell where the failure occurs is also the cell that last serves the UE prior to the failure. The UE stores one or more of the following information:

- Cell identity of the cell A, which may be a global cell identity or a physical cell identifier (PCI) and frequency information;
- Tracking area code (TAC) or tracking area identity (TAI) of the cell A;
- Cell identity of the source cell that triggers the last handover;
- TAC or TAI of the source cell that triggers the last handover;
- Time elapsed from the beginning of the last handover to the failure;
- Connection failure being an RLF or a handover failure;
- Radio measurements of the UE;
- C-RNTI allocated to the UE by the cell that last serves the UE prior to the failure;
- Cause of triggering an RLF;
- Cell identity of the cell where the UE attempts to re-establish the RRC connection, or the UE attempts to establish the RRC connection, or the UE establishes the RRC connection, after the failure;
- Time elapsed from the failure to the UE RLF report.

The last two items may be stored in a subsequent procedure. For example, when the UE attempts to re-establish the RRC connection, the UE records the cell identity of the cell where the UE attempts to re-establish the RRC connection after the failure. When the UE prepares to transmit the RLF report, the UE records the time elapsed from the failure to the UE RLF report.

All the above cell identities may be the global cell identity or the PCI and the frequency information.

The UE also stores the RLF report of which radio access technology the stored RLF report information is, such as an LTE RLF report or an NR RLF report.

If the base station 1 is the LTE base station (for example, an ng-eNB or an eNB), the above RLF report information is the LTE RLF report, which is in the format and encoding of the LTE RRC.

If the base station 1 is an NR base station (for example, a gNB), the above-mentioned RLF report information is the NR RLF report, which is in the format and encoding of the NR RRC.

Step 402: The UE re-establishes the RRC connection in a cell of the base station 2. The UE may re-establish the RRC connection through the RRC connection establishment or RRC connection re-establishment procedure. In the RRC connection establishment completion or RRC connection re-establishment completion message, the UE indicates, to the network, that the RLF report information is available. The UE may indicate, to the network, that the RLF report information is available. The UE may also indicate, to the network, that the RLF report information of which radio access technology is available, for example, the UE indicates, to the network, that the LTE RLF report or the NR RLF report is available. The ULE may also indicate, to the network, the LTE RLF report and the NR RLF report are available.

The method of the present disclosure may further include the step of: broadcasting, by the base station, whether the base station supports the RLF information reporting, or broadcasting, by the base station, the RLF information reporting of which radio access technology the base station supports. For example, the LTE base station broadcasts whether the LTE base station supports the NR RLF information reporting and/or the LTE RLF information reporting, and the NR base station broadcasts whether the NR base station supports the LTE RLF information reporting and/or the NR RLF information reporting. If the base station with which the UE re-establishes the RRC connection supports the RLF information reporting, or supports the RLF information reporting of the corresponding radio access technology stored by the TE, the UE transmits, to the re-accessed base station, that the RLF information reporting or the RLF information reporting of which radio access technology is available. For example, the UE may indicate to the base station that the RLF information reporting to the base station is available, and the UE may also indicate that the NR RLF information reporting or the LTE RLF information reporting to the base station is available.

If the base station 2 is the NR base station gNB, and the UE stores the LTE RLF report, the UE indicates, to the base station 2, that the RLF report information is available, through the RRC connection establishment completion or RRC connection re-establishment completion message of the NR. The UE may indicate that the RLF report information is available to the base station 2 through the RRC connection establishment completion or RRC connection re-establishment completion message of the NR. The UE may also indicate, to the base station 2, the RLF report information of which radio access technology is available, for example, the UE indicates, to the base station 2, that the LTE RLF report or the NR RLF report is available. The UE may also indicate, to the base station 2, that the LTE RLF report and the NR RLF report are available.

If the base station 2 is the LTE base station ng-eNB or eNB, and the UE stores the NR RLF report, the UE indicates, to the base station 2, that the RLF report information is available, through the RRC connection establishment completion or RRC connection re-establishment completion message of the LTE. The UE may indicate that the RLF report information is available to the base station 2 through the RRC connection establishment completion or RRC connection re-establishment completion message of the LTE. The UE may also indicate, to the base station 2, the RLF report information of which radio access technology is available, for example, the UE indicates, to the base station 2, that the LTE RLF report or the NR RLF report is available. The UE may also indicate, to the base station 2, that the LTE RLF report and the NR RLF report are available.

Step 403: The base station 2 requests the UE to report the RLF report, and the UE transmits the UE RLF report to the base station 2.

The base station 2 may also indicate, to the UE, the RLF report of which radio access technology is requested. For example, the base station 2 requests the UE to report the LTE RLF report or the NR RLF report. The base station 2 may also request the UE to report the LTE RLF report and the NR RLF report. The base station 2 requests the UE to report the RLF report according to the RLF report being available or the RLF report of which radio access technology being available indicated by the UE in the RRC connection establishment completion or RRC connection re-establishment completion message. For example, if the UE indicates that the LTE RLF report is available, and the base station 2 supports the request for the LTE report, the base station 2 may request the UE to report the LTE RLF report. If the UE indicates that the NR RLF report is available, and the base station 2 supports the request for the NR report, the base station 2 may request the UE to report the NR RLF report.

Alternatively, the base station does not need to distinguish between the radio access technologies. The UE indicates that the RLF report is available, and then the base station requests the UE to report the RLF report.

The base station may request the UE RLF report through a UE information request message. The UE information request may include the RLF report of which radio access technology is requested, for example, the NR RLF report is requested or the LTE RLF report is requested.

The UE may transmit the RLF report to the base station through a UE information response message. The UE information response message includes the RLF report. The RLF report may be the LTE RLF report and/or the NR RLF report.

The UE RLF report includes the content described in step 401, the cell identity of the cell that last serves the UE before the failure occurs is included in the UE RLF report by the UE. The cell that last serves the UE prior to the failure is also the cell where the failure occurs. For the handover failure, the cell is a target cell on a target base station. All the cell identities may be the global cell identity or the PCI and frequency information. In the present embodiment, the cell is cell A.

The TAC or TAI of the cell that last serves the UE before the failure occurs is included in the UE RLF report by the UE. The cell that last serves the UE prior to the failure is also the cell where the failure occurs. For handover failure, the cell is the target cell on the target base station. In the present embodiment, the cell is cell A.

If the base station 1 is the LTE base station and the base station 2 is the NR base station, the LTE RLF report information is included in the NR RRC message by the UE.

If the base station 1 is the NR base station and the base station 2 is the LTE base station, the NR RLF report information is included in the LTE RRC message by the UE.

Step 404: The base station 2 decodes the ULE RLF report. The base station 2 knows the cell that last serves the UE prior to the failure according to cell identity of the cell that last serves the UE before the failure occurs included in the RLF report included in the RRC message. Here, the cell that last serves the UE prior to the failure is controlled by the base station 1. The base station 2 transmits a failure indication message to the base station 1. The failure indication message includes the RLF report received from the UE.

If there is no Xn interface between the base station 2 and the base station 1, the base station 2 needs to transmit the failure indication message to the base station 1 through the core network. The base station 2 knows the TAI of the cell of the base station 1 from the cell identity of the cell that last serves the UE before the failure occurs and the TAC or TAI of the cell included in the RLF report included in the RRC message. The base station 2 transmits a message to the core network, and the message includes the UE RLF report and the TAI of the cell in which the failure occurs. The TAI is used for routing in the core network, for example, the TAI is used by core network entity 2 (such as AMF2 or MME2) to which the base station 2 is connected to find core network entity 1 (such as AMF1 or MME1) to which the base station 1 is connected. The base station 1 and the base station 2 may also be connected to the same core network entity. That is, the core network entity 1 and the core network entity 2 may be the same entity or different entities. The details are as described in the embodiments in FIGS. 6 and 7.

The base station 2 needs to decode the RLF report container from the base station 1.

If the base station 1 is the LTE base station ng-eNB, and the base station 2 is the NR base station gNB, the gNB needs to decode the content of the LTE RLF report, and knows the cell that last serves the UE prior to the failure according to the cell identity of the cell that last serves the UE before the failure occurs included in the LTE RLF report, and thus knows the base station which controls the cell, and transmits a failure indication message to the base station. The gNB needs to support the RRC of the LTE so as to transmit a failure indication message to the base station which controls the cell that last serves the UE prior to the failure. Similarly, in the case where there is no Xn interface between the base station 1 and the base station 2, the gNB needs to decode the TAC or TAI included in the LTE RLF report, and knows the TAI of the cell in which the failure occurs, so as to transmit the RLF report to the base station 1 through the core network. This method has advantages in that the UE does not need to wait to transmit the UE RLF report until the UE reconnects to the LTE base station, which reduces the time for the UE to store the RLF report and stores the UE's memory space.

If the base station 1 is the NR base station gNB, and the base station 2 is the LTE base station ng-eNB or eNB, the ng-eNB or the eNB needs to decode the content of the NR RLF report, and knows the cell that last serves the UE prior to the failure according to the cell identity of the cell that last serves the UE before the failure occurs included in the NR RLF report, and thus knows the base station which controls the cell, and transmits a failure indication message to the base station. The ng-eNB or the eNB needs to support the RRC of the NR so as to transmit a failure indication message to the base station which controls the cell that last serves the UE prior to the failure. Similarly, in the case where there is no Xn interface between the base station 1 and the base station 2, the ng-eNB or the eNB needs to decode the content of the NR RLF report, and knows, from the NR RLF, the TAI of the cell where the failure occurs, so as to transmit an RLF report to the base station 1 through the core network. This method has advantages in that the UE does not need to wait to transmit the TE RLF report until the TE re-connects to the NR base station, which reduces the time for the UE to store the RLF report and stores the UE's memory space.

Step 405: The base station 1 checks the cause of the failure occurring, such as too early handover, too late handover, or handover to wrong cell. The base station 1 may detect the cause of the failure occurring according to the existing mechanism, and details are not described herein repeatedly.

For the too early handover or the handover to wrong cell, the base station 1 transmits a handover report message to the base station which controls the source cell that triggers the last handover, such as the base station 3. The base station 1 knows the identity of the source cell that triggers the last handover according to the UE RLF report. The handover report message includes the cell identity of the cell where the UE attempts to establish the RRC connection, or the UE establishes the RRC connection, after the failure. If the base station 1 and the base station 3 belong to base stations supporting different radio access technologies, the handover report may not include the UE RLF report. The handover report message directly includes a combination of one or more of information as described in step 305, in this way, the base station 3 may know more information about the failure without parsing the RRC information of other radio access technologies, so as to confirm the cause of the failure and make reasonable parameter adjustments to avoid future failures.

So far, the description of the second method for supporting self-configuration and self-optimisation of the present disclosure is completed. This method may enable the network to correctly detect the cause of the failure in the case that the UE fails when moving between different RATs, while reducing the time for the UE to store RLF report information.

Figure 5:
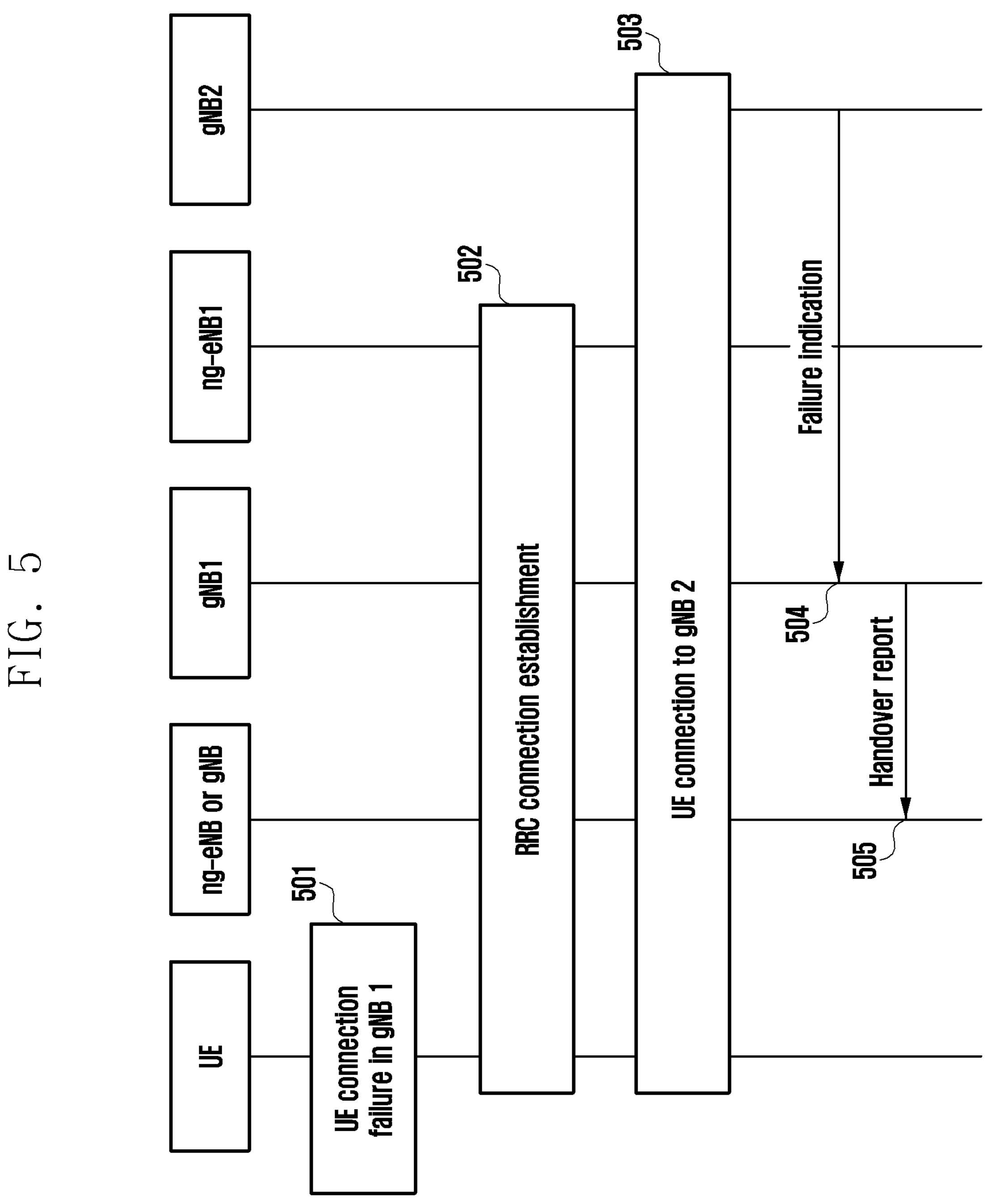
FIG. 5 illustrates a third method for supporting self-configuration and self-optimisation according to the present disclosure.

A third method for supporting self-configuration and self-optimisation according to the present disclosure is illustrated in FIG. 5. A detailed description of steps which are not related to the present disclosure is omitted here. This method is illustrated by taking an example in which the failure occurs in an NR base station gNB, and the base station that the UE re-accesses after the failure is an LTE base station ng-eNB or eNB. Conversely, this method may be applicable as well, for example, the failure occurs in the LTE base station ng-eNB or eNB, and the base station that the UE re-accesses after the failure is the NR base station gNB.

The method includes steps as follows.

Step 501: A UE fails in a cell of the gNB1, and it is assumed that the UE fails in cell A. Herein, the failure may be an RLF or a handover failure. For the handover failure, the cell A is a target cell for the handover. The cell where the failure occurs is also the cell that last serves the UE prior to the failure. The UE stores one or more of the following information:

Cell identity of the cell A, which may be a global cell identity or a physical cell identifier (PCI) and frequency information;

Tracking area code (TAC) or tracking area identity (TAI) of the cell A;

Cell identity of the source cell that triggers the last handover;

Time elapsed from the beginning of the last handover to the failure;

Connection failure being an RLF or a handover failure;

Radio measurements of the UE;

C-RNTI allocated to the UE by the cell that last serves the UE prior to the failure;

Cause of triggering an RLF;

Cell identity of the cell where the UE attempts to re-establish the RRC connection after the failure;

Cell identity of the cell where the UE successfully establishes the RRC connection, or cell identity of the cell where the UE attempts to establish the RRC connection, after the failure;

Time elapsed from the failure to the UE R LF report.

Time elapsed from the failure to the RRC re-connection attempt or successful access to the network. The RRC re-connection attempt refers to transmission of an RRC connection establishment request or RRC connection re-establishment request message. The successful access to the network may be that the UE transmits the RRC connection establishment completion or RRC connection re-establishment completion or RACH success message.

The last four items may be stored in a subsequent procedure. For example, when the UE attempts to re-establish the RRC connection, the UE records the cell identity of the cell where the UE attempts to re-establish the RRC connection after the failure. When the UE successfully re-establishes the RRC connection or the UE attempts to establish the RRC connection, the UE records the cell identity of the cell where the UE successfully establishes the RRC connection or the cell identity of the cell where the UE attempts to establish the RRC connection. When the UE prepares to transmit the RLF report, the UE records the time elapsed from the failure to the UE RLF report. Upon successful access to the network, the UE records the time elapsed from the failure to successful access to the network.

All the above cell identities may be the global cell identity or the PCI and the frequency information.

The UE also stores the RLF report of which radio access technology the stored RLF report information is, such as an LTE RLF report or an NR RLF report.

The above-mentioned RLF report information is an NR RLF report, which is in a format and encoding of the NR RRC.

Step 502: The UE re-establishes the RRC connection in the cell of the ng-eNB1 or the eNB. The UE may re-establish the RRC connection through the RRC connection establishment or RRC connection re-establishment procedure. In the RRC connection establishment completion or RRC connection re-establishment completion message, the UE indicates, to the network, that the RLF report information is available.

Step 503: the UE is connected to the gNB2. The UE may access the gNB2 through RRC connection establishment or RRC connection re-establishment or handover. In the RRC connection establishment completion or RRC connection re-establishment completion or RRC reconfiguration completion message, the UE indicates, to the network, that the RLF report information is available. The RRC reconfiguration completion message is used to indicate the handover completion. The UE may also indicate, to the network, that the RLF report information of which radio access technology is available, for example, in the present embodiment, the UE indicates, to the network, that the NR RLF report is available.

The method of the present disclosure may further include the step of broadcasting, by the base station, whether the base station supports the RLF information reporting. If the base station with which the UE re-establishes the RRC connection supports the RLF information reporting, the UE transmits, to the re-accessed base station that the RLF information reporting is available. For example, the UE may indicate, to the base station, that the RLF information reporting is available.

The UE stores that the RLF report information is the RLF report of which radio access technology, and when the UE re-accesses the base station of the corresponding radio access technology, the UE indicates, to the base station, that the RLF report information is available.

The gNB2 requests the UE to report the RLF report, and the UE transmits a UE RLF report to the gNB2.

The UE RLF report includes the content described in step 501. The gNB2 knows the base station which controls the cell where the failure occurs, according to the cell identity of the cell that last serves the UE before the failure occurs included in the UE RLF report. The gNB2 transmits a failure indication message to the gNB1. The failure indication message includes the RLF report received from the UE.

If there is no Xn interface between the gNB2 and the gNB1, the gNB2 needs to transmit the RLF report to the gNB1 through the core network. The gNB2 knows the TAI of the cell where the failure occurs from the cell identity of and the TAC or TAI of the cell where the failure occurs included in the UE RLF report. The gNB2 transmits the RLF report received from the UE through the NG interface, the transmitted RLF report message includes the TAI of the cell where the failure occurs. The TAI is used for routing in the core network, for example, the TAI is used by core network entity 2 (such as AMF2) to which the gNB2 is connected to find core network entity 1 (such as AMF1) to which the gNB1 is connected. The gNB1 and the gNB2 may also be connected to the same AMF. That is, the AMF1 and the AMF2 may be the same AMF or different AMFs. The details are as described in the embodiments in FIGS. 6 and 7.

Step 504: The gNB2 transmits a failure indication message to the gNB1. The failure indication message includes the RLF report received from the UE.

If there is no Xn interface between the gNB 2 and the gNB 1, the gNB 2 needs to transmit a failure indication message to the gNB 1 through the core network. The gNB 2 knows the TAI of the cell of the base station 1, from the cell identity of the cell that last serves the UE before the failure occurs and the TAC or TAI of the cell included in the RLF report included in the RRC message. The gNB 2 transmits a message to the core network, and the message includes the UE RLF report and the TAI of the cell in which the failure occurs. The TAI is used for routing in the core network, for example, the TAI is used by core network entity 2 (such as AMF2) to which the gNB2 is connected to find the core network entity 1 (such as AMF1) to which the gNB1 is connected. The gNB1 and the gNB2 may also be connected to the same AMF, that is, AMF1 and AMF2 may be the same AMF or different AMFs. The details are as described in the embodiments in FIGS. 6 and 7.

Step 505: The gNB 1 checks the cause of the failure occurring, such as too early handover, too late handover, or handover to wrong cell. The gNB 1 knows the right cell to which the UE may be handed over according to the cell identity of cell where the UE successfully establishes the RRC connection or the cell identity of cell where the UE attempts to establish the RRC connection, after the failure. For the too late handover, the failed cell may handover the UE to the cell where the UE successfully establishes the RRC connection or the cell where the UE attempts to establish the RRC connection. For the too early handover or the handover to wrong cell, the source cell that triggers the last handover may handover the UE to the cell where the UE successfully establishes the RRC connection or the cell where the UE attempts to establish the RRC connection. The gNB1 may also determine whether the cell where the UE successfully establishes the RRC connection or the cell where the UE attempts to establish the RRC connection after the failure is a suitable handover cell according to the time elapsed from the failure to the successful access to the network or the time elapsed from the failure to the RRC re-connection attempt.

For the too early handover or the handover to wrong cell, the gNB1 transmits a handover report message to the base station which controls the source cell that triggers the last handover, such as the eNB or the ng-eNB or the gNB. The gNB1 knows the identity of the source cell that triggers the last handover according to the UE RLF report. The handover report message includes the cell identity of the cell where the UE attempts to establish the RRC connection or the cell identity of the cell the UE establishes the RRC connection, after the failure. Optionally, the handover report message may include the cell identity of the target cell for the handover. If the base station that triggers the last handover is not a base station that supports the NR access technology (for example, the eNB or the ng-eNB), the handover report may not include the UE RLF report. The handover report message directly includes a combination of one or more of the information described in step 305, in this way the eNB or the ng-eNB may know more information about the failure without parsing the NR RRC information, so as to confirm the cause of the failure and make reasonable parameter adjustments to avoid future failures. The gNB 1 obtains the one or more information described in step 305 from the UE RLF report, and the gNB 1 makes one or more of the information directly included in the handover report message, and sends the handover report message to the base station which controls the source cell that triggers the last handover. The gNB 1 may makes one or more of the above information included in the handover report message in the case where the base station that triggers the last handover is not a base station that supports the NR radio access technology. In this way, the base station that triggers the last handover may determine the cause of the failure and make reasonable parameter adjustments to avoid future failure, without parsing the content in the UE RLF report of different radio access technologies.

So far, the description of the third method for supporting self-configuration and self-optimisation of the present disclosure is completed. This method may enable the network to correctly detect the cause of the failure in the case that the UE fails when moving between different RATs, while reducing the process on the base station side, that is, the NR base station does not need to decode the content of the LTE RRC and the LTE base station does not need to decode the content of the NR RRC.

Figure 6:
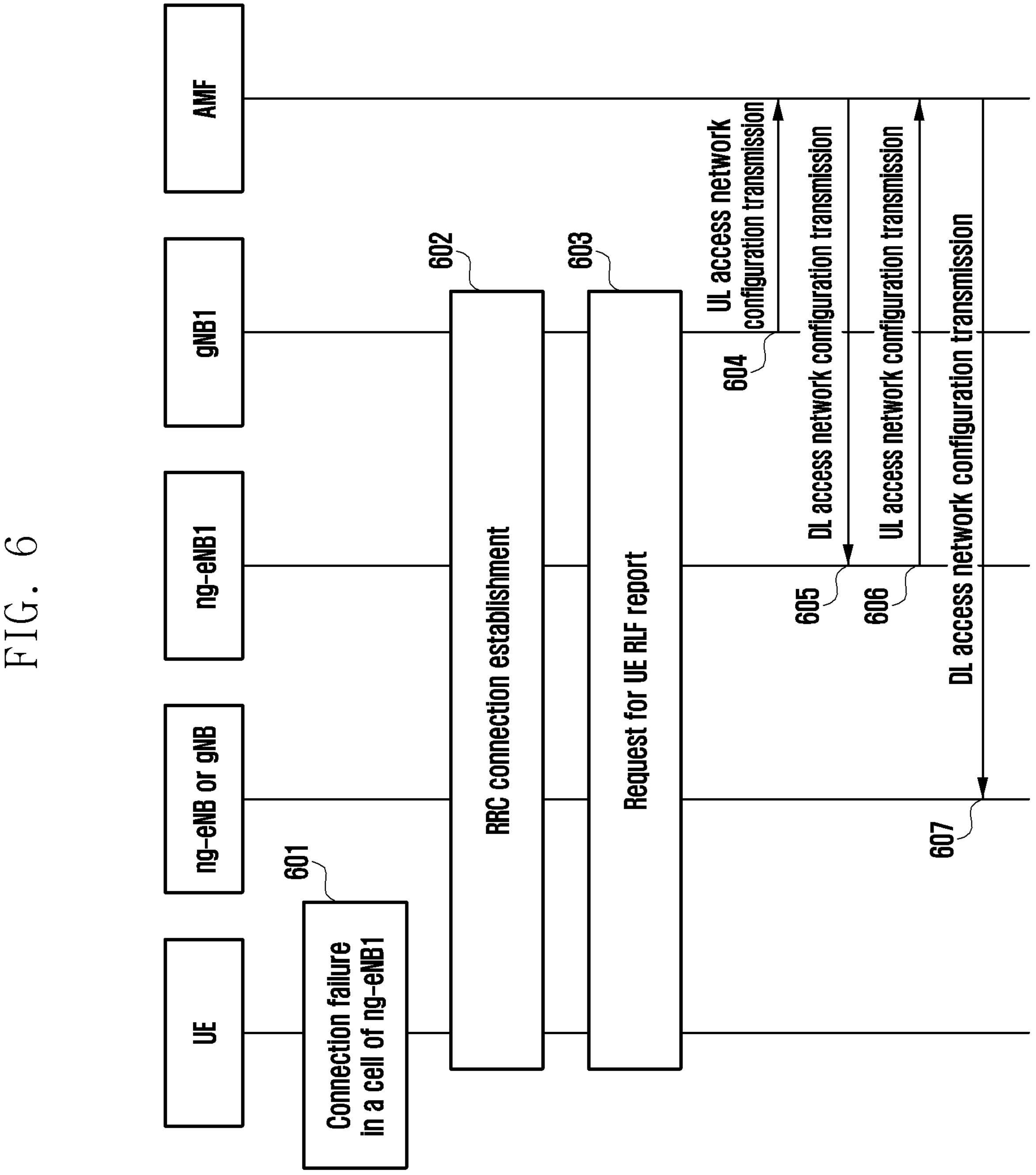
FIG. 6 illustrates a first embodiment of the first method for supporting self-configuration and self-optimisation according to the present disclosure.

A first embodiment of the first method for supporting self-configuration and self-optimisation according to the present disclosure is illustrated in FIG. 6. A detailed description of steps which are not related to the present disclosure is omitted here. The method includes steps as follows.

Step 601: A UE fails in a cell of an ng-eNB1 or an eNB, and it is assumed that the UE fails in cell A. The failure here may be an RLF or a handover failure. For the handover failure, the cell A is a target cell for the handover. The cell where the failure occurs is also the cell that last serves the UE prior to the failure. The UE stores one or more of the following information:

- Cell identity of the cell A, which may be a global cell identity or a physical cell identifier (PCI) and frequency information;
- Tracking area code (TAC) or tracking area identity (TAI) of the cell A;
- Cell identity of the source cell that triggers the last handover;
- TAC or TAI of the source cell that triggers the last handover;
- Time elapsed from the beginning of the last handover to the failure;
- Connection failure being an RLF or a handover failure;
- Radio measurements of the UE;
- C-RNTI allocated to the UE by the cell that last serves the UE prior to the failure;
- Cause of triggering an RLF;
- Cell identity of the cell where the UE attempts to re-establish the RRC connection, or cell identity of the cell where the UE attempts to establish the RRC connection, or cell identity of the cell where the UE establishes the RRC connection, after the failure;
- Time elapsed from the failure to the UE RLF report.

The last two items may be stored in a subsequent procedure. For example, when the UE attempts to re-establish the RRC connection, the UE records the cell identity of the cell where the UE attempts to re-establish the RRC connection after the failure. When the UE prepares to transmit the RLF report, the UE records the time elapsed from the failure to the UE RLF report.

All the above cell identities may be the global cell identity or the PCI and the frequency information.

The UE also stores the RLF report of which radio access technology the stored RLF report information is, for example, the stored RLF report information is an LTE RLF report in the present embodiment.

The above RLF report information is the LTE RLF report, which is in the format and encoding of the LTE RRC.

Step 602: The UE re-establishes the RRC connection in a cell of the gNB1. The UE may re-establish the RRC connection through the RRC connection establishment or RRC connection re-establishment procedure. In the RRC connection establishment completion or RRC connection re-establishment completion message, the UE indicates, to the network, that the RLF report information is available. The UE may indicate, to the network, that the RLF report information is available. The UE may also indicate, to the network, that the RLF report information of which radio access technology is available, for example, the UE indicates to the network the LTE RLF report is available in the present embodiment.

Through the RRC connection establishment completion or RRC connection re-establishment completion message of the NR, the UE indicates, to the gNB1, that the RLF report or the LTE RLF report information is available. The RLF report is the LTE RLF report.

The method of the present disclosure may further include the step of: broadcasting, by the base station, whether the base station supports the RLF information reporting, or broadcasting, by the base station, the RLF information reporting of which radio access technology the base station supports. For example, the gNB1 broadcasts whether the gNB1 supports the LTE RLF information reporting and/or the NR RLF information reporting. If the gNB1 supports the RLF information reporting, or the RLF information reporting of the corresponding radio access technology stored by the UE, the UE transmits, to the re-accessed gNB1, the RLF information reporting or the RLF information reporting of the corresponding radio access technology is available. For example, the gNB1 broadcasts that the gNB1 supports the LTE RLF information reporting, and the UE stores the LTE RLF report, thus the UE may indicate to the gNB1 that the LTE RLF reporting to the gNB1 is available.

Step 603: The gNB1 requests the UE to report the RLF report, and the UE transmits the UE RLF report to the gNB1.

The gNB1 requests the UE to report the RLF report according to the RLF report being available indicated by the UE in the RRC connection establishment completion or RRC connection re-establishment completion message.

The gNB1 may also indicate, to the UE, the LTE RLF report is requested. The gNB1 requests the UE to report the LTE RLF report according to the RLF report being available indicated by the UE in the RRC connection establishment completion or RRC connection re-establishment completion message. For example, if the UE indicates the LTE RLF report is available, and the gNB1 supports the request for the LTE RLF report, the gNB1 may request the UE to report the LTE RLF report.

Alternatively, the base station does not need to distinguish between the radio access technologies. The UE indicates that the RLF report is available, and then the base station requests the UE to report the RLF report.

The base station may request the UE RLF report through a UE information request message. The UE information request may include the RLF report of which radio access technology is requested, for example, the NR RLF report is requested or the LTE RLF report is requested.

The UE may transmit the RLF report to the base station through a UE information response message. The UE information response message includes the RLF report. The RLF report may be the LTE RLF report and/or the NR RLF report.

The UE RLF report includes the content described in step 601. In the UE RLF report, the cell identity of the cell that last serves the UE before the failure occurs is included. In the message of transmitting the UE RLF report (outside the UE RLF report container), the cell identity of the cell that last serves the UE before the failure occurs is also included. The cell that last serves the UE prior to the failure is also the cell where the failure occurs. For the handover failure, the cell is a target cell of a target base station. All the cell identities may be the global cell identity or the PCI and frequency information. In the present embodiment, the cell is cell A.

In the UE RLF report, the TAC or TAI of the cell that last serves the UE before the failure occurs is included. In the NR RRC message of transmitting the UE RLF report (outside the UE RLF report container), the TAC or TAI of the cell that last serves the UE before the failure occurs is also included. The cell that last serves the UE prior to the failure is also the cell where the failure occurs. For handover failure, the cell is the target cell of the target base station. In the present embodiment, this cell is cell A.

The LTE RLF report information is included in the NR RRC message by the UE, and cell identity of the cell that last serves the UE before the failure occurs and/or the TAC or TAI of the cell are also included in the NR RRC message (outside the LTE RLF report container) by the UE.

Step 604: The gNB1 knows the cell that last serves the UE prior to the failure according to the cell identity of the cell that last serves the TE before the failure occurs included in the NR RRC message, and thus knows the base station which controls this cell. Here, the cell that last serves the TE prior to the failure is controlled by the ng-eNB1 or eNB1.

If there is no Xn interface between the gNB1 and the ng-eNB1 or there is no interface between the gNB1 and the eNB1, the gNB1 needs to transmit the RLF report received from the TE to the ng-eNB1 or the eNB1 through the core network. Therefore, the TE RLF report information is included in the inter-system self-optimisation (SON) message at an interface between the gNB and the 5GS and an interface between the eNB to the EPC.

The gNB1 transmits an uplink RAN configuration transfer of an NG application protocol (AP) message to the AMF. Here, other NGAP messages are possible to be used. The message includes the TAI of the cell in which the failure occurs and/or the base station identity of the base station which controls the cell in which the failure occurs. The gNB1 sets the identity of the target base station in the message as the base station identity of the base station which controls the cell where the failure occurs. The gNB1 knows the TAI of the cell in which the failure occurs according to the cell identity and the TAC or TAI of the cell where the failure occurs received from the NR RRC message. The gNB1 knows the base station identity of the base station which controls the cell where the failure occurs according to the cell identity of the cell where the failure occurs received from the NR RRC message, that is, the base station identity of the ng-eNB1 or the eNB1.

The TAI is used for routing in the core network. For example, the AMF entity to which the gNB1 is connected uses the TAI to find the AMF entity to which the ng-eNB1 is connected or the MME entity to which the eNB is connected, and forwards the information in the uplink access configuration transmission message to the AMF to which the ng-eNB1 is connected or the MME entity to which the eNB is connected. The gNB1 and ng-eNB1 may be connected to the same AMF or different AMFs, and the AMF entity to which the gNB1 is connected knows whether the gNB1 and ng-eNB are connected to the same AMF, according to the TAI.

In an actual network, the LTE base station where the ULE fails may be an ng-eNB connected to the 5GC or an eNB connected to the MME. When the failure occurs at the eNB, the content of the UE RLF is the same as that when the failure occurs at the ng-eNB. If the failure occurs at the ng-eNB, the TAC of the cell in which the failure occurs is 3 bytes in length, and if the failure occurs at the eNB, the TAC of the cell in which the failure occurs is 2 bytes in length. The AMF can know whether the cell where the failure occurs is controlled by an eNB or an ng-eNB based on the length of the TAC. If the failure occurs is controlled by the eNB, the AMF finds the MME connected to the base station which controls the cell where the failure occurs according to the TAI, and the AMF transmits the information of the NGAP message received from the gNB to the MME. The MME transmits a UE RLF report to the eNB which controls the cell where the failure occurs, according to the target base station identity.

The identity of the base station which controls the cell where the failure occurs is used by the core network to transmit a downlink RAN configuration transfer message to the ng-eNB1, otherwise the AMF does not know to which base station the message may be transmitted.

The gNB1 does not need to decode the RLF report container of the LTE. This method may simplify the base station.

The gNB1 knows the cell that last serves the LE prior to the failure directly according to the cell identity of the cell that last serves the UE before the failure occurs included in the NR RRC message, and thus knows the base station which controls the cell, and transmits a failure indication message to the base station. The gNB1 may transmit a failure indication message to the base station which controls the cell that last serves the UE prior to the failure, without a support for implementing the RRC of the LTE. Similarly, in the case where there is no Xn interface between the gNB1 and the ng-eNB1, the gNB1 does not need to decode the content of the LTE RLF report, and may know the TAI of the cell where the failure occurs directly from the NR RRC message, and know the base station identity of the base station which controls the cell where the failure occurs according to the cell identity of the cell where the failure occurs, so as to transmit the RLF report to the ng-eNB1 through the core network. Meanwhile, the UE does not need to wait to transmit the UE RLF report until the UE reconnects to the LTE base station, which reduces the time for the UE to store the RLF report and stores the UE's memory space. Similarly, in the case where there is no Xn interface between the gNB1 and the ng-eNB1, the gNB1 does not need to decode the content of the LTE RLF report, and may know the TAI of the cell where the failure occurs and/or the base station identity of the base station which controls the cell where the failure occurs directly from the NR RRC message, so as to transmit the RLF report to the ng-eNB1 through the core network.

Step 605: The AMF transmits a downlink RAN configuration transfer of the NGAP message to the ng-eNB1. Here, other NGAP messages are possible to be used. The AMF knows which base station the message is to be transmitted to, according to the identity of the target base station. For the case where the LTE base station where the UE fails is an eNB1, the MME transmits an MME configuration transfer of the S1AP message to the eNB1. Here, other S1AP messages are possible to be used. The MME knows which base station the message is to be transmitted to, according to the identity of the target base station.

Step 606: The ng-eNB1 or the eNB detects the cause of the failure occurring, such as too early handover, too late handover, or handover to wrong cell. The ng-eNB1 or the eNB may detect the cause of the failure occurring according to the existing mechanism, and details are not described herein repeatedly.

For too early handover or handover to wrong cell, the ng-eNB1 or the eNB transmits a handover report message to the base station which controls the source cell that triggers the last handover, such as the ng-eNB1 or the eNB or the gNB. The ng-eNB1 or the eNB knows the identity of the source cell that triggers the last handover according to the UE RLF report, and may thus know the base station identity of the base station which controls the source cell that triggers the last handover. The handover report message includes the cell identity of the cell where the UE attempts to establish the RRC connection, or the cell identity of the cell where the UE establishes the RRC connection, after the failure. Optionally, the handover report message may include the cell identity of the target cell for the handover. If the base station that triggers the last handover is not a base station supporting the LTE access technology (e.g., the gNB), the handover report may not include the UE RLF report. The handover report message directly includes a combination of one or more of information as described in step 305. In this way, the gNB may know more information about the failure without parsing the LTE RRC information, so as to confirm the cause of the failure and make reasonable parameter adjustments to avoid future failures. The ng-eNB1 or the eNB obtains the one or more information described in step 305 from the ULE RLF report, and the ng-eNB1 or the eNB makes one or more of the information directly included in the handover report message, and sends the handover report message to the base station which controls the source cell that triggers the last handover. The ng-eNB1 or the eNB may makes one or more of the above information included in the handover report message in the case where the base station that triggers the last handover is not a base station that supports the LTE radio access technology. In this way, the base station that triggers the last handover may determine the cause of the failure and make reasonable parameter adjustments to avoid future failures, without parsing the content of the UE RLF report in different radio access technologies.

If there is no Xn interface between the ng-eNB1 or the eNB and the base station which controls the source cell that triggers the last handover, the handover report needs to be transmitted through the core network to the base station, the ng-eNB or the eNB or the gNB, which controls the source cell that triggers the last handover.

The ng-eNB1 transmits an uplink RAN configuration transfer of the NGAP message to the AMF. The eNB transmits the eNB configuration transfer message to the MME. The TAI included in the message is set as the TAI of the source cell that triggers the last handover. The target base station identity is set as the base station identity of the base station which controls the source cell that triggers the last handover. The message includes information about the too early handover or the handover to wrong cell. The message may also be other NGAP or S1AP messages. The ng-eNB1 or the eNB knows the TAI of the source cell that triggers the last handover according to the UE RLF report, and knows the base station identity of the base station which controls the source cell that triggers the last handover according to the cell identity of the source cell that triggers the last handover.

Step 607: The AMF transmits a downlink RAN configuration transfer of the NGAP message to the ng-eNB or the gNB. For the case where the base station that last triggers the handover is an LTE base station eNB, the MME transmits an MME configuration transfer of the S1AP message to the eNB. Here, other S1AP messages are possible to be used. The MME knows which base station the message is to be transmitted to, according to the target base station identity. The detailed description of the procedure between the AMF and the MME is omitted here.

So far, the description of the first embodiment of the first method for supporting self-configuration and self-optimisation of the present disclosure is completed. This method may enable the network to correctly detect the cause of the failure in the case that the UE fails when moving between different RATs, while reducing the time for the UE to store RLF report information and reducing the process on the base station side, that is, the NR base station does not need to decode the content of the LTE RRC and the LTE base station does not need to decode the content of the NR RRC. When there is no Xn interface between the base station which controls the cell where the failure occurs and the base station which controls the cell where the UE reconnects, the NR base station may still transmit the RLF report to the base station which controls the cell where the failure occurs through the core network without parsing the LTE RLF. When there is no Xn interface between the base station which controls the cell where the failure occurs and the base station which controls the cell that triggers the last handover, the base station which controls the cell where the failure occurs may still transmit a handover report to the base station which controls the source cell that triggers the last handover.

Figure 7:
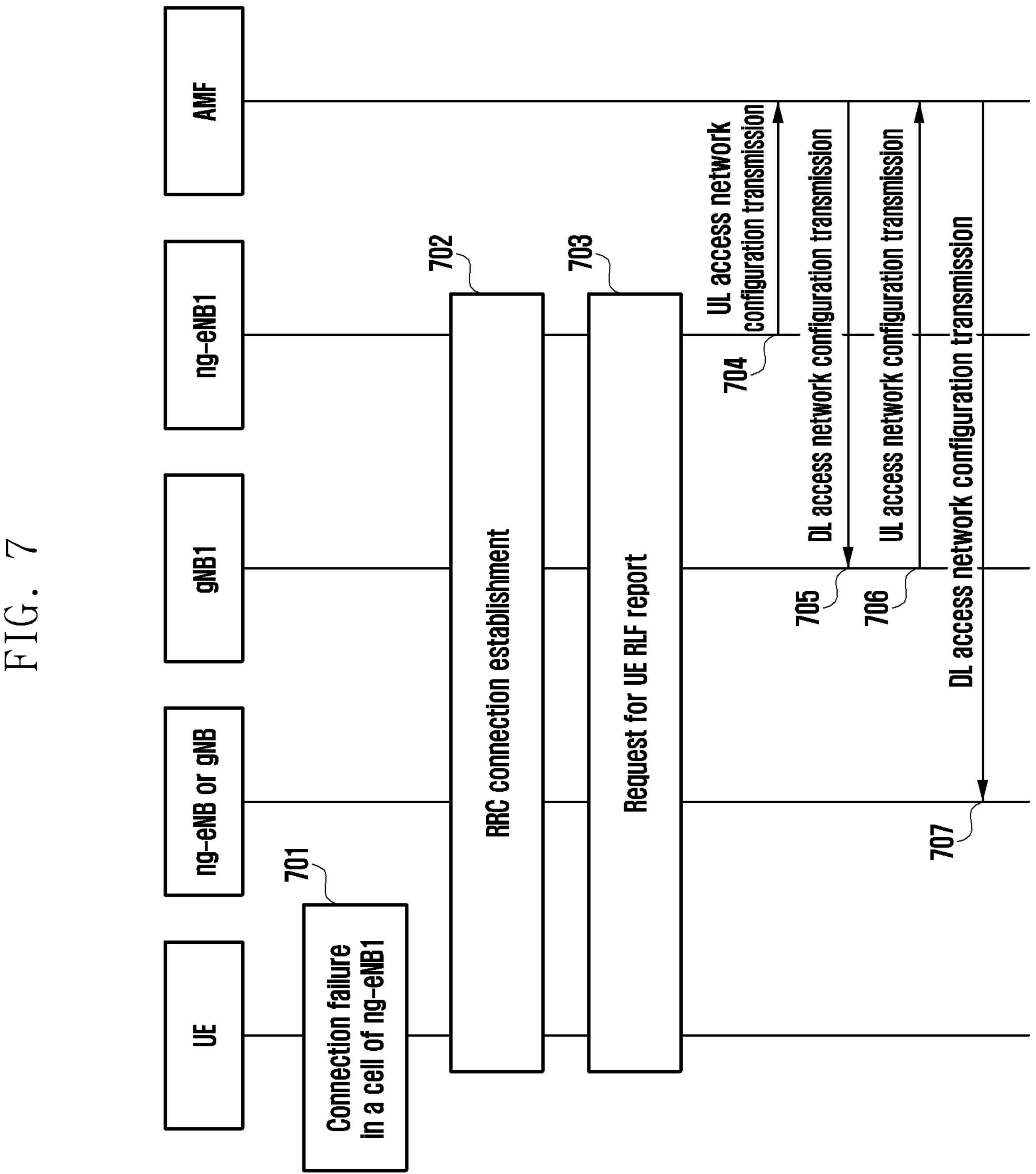
FIG. 7 illustrates a second embodiment of the first method for supporting self-configuration and self-optimisation according to the present disclosure.

A second embodiment of the first method for supporting self-configuration and self-optimisation according to the present disclosure is illustrated in FIG. 7. A detailed description of steps which are not related to the present disclosure is omitted here. The method includes steps as follows.

Step 701: A UE fails in a cell of a gNB1, and it is assumed that the UE fails in cell A. The failure here may be an RLF or a handover failure. For handover failure, the cell A is a target cell for the handover. The cell where the failure occurs is also the cell that last serves the UE prior to the failure. The UE stores one or more of the following information:

- Cell identity of the cell A, which may be a global cell identity or a physical cell identifier (PCI) and frequency information;
- Tracking area code (TAC) or tracking area identity (TAI) of the cell A;
- Cell identity of the source cell that triggers the last handover;
- TAC or TAI of the source cell that triggers the last handover;
- Time elapsed from the beginning of the last handover to the failure;
- Connection failure being an RLF or a handover failure;
- Radio measurements of the UE;
- C-RNTI allocated to the UE by the cell that last serves the UE prior to the failure;
- Cause of triggering an RLF;
- Cell identity of the cell where the UE attempts to re-establish the RRC connection, or cell identity of the cell where the UE attempts to establish the RRC connection, or cell identity of the cell where the UE establishes the RRC connection, after the failure;
- Time elapsed from the failure to the UE RLF report.

The last two items may be stored in a subsequent procedure. For example, when the UE attempts to re-establish the RRC connection, the UE records the cell identity of the cell where the UE attempts to re-establish the RRC connection after the failure. When the UE prepares to transmit the RLF report, the UE records the time elapsed from the failure to the UE RLF report.

All the above cell identities may be the global cell identity or the PCI and the frequency information.

The UE also stores the RLF report of which radio access technology the stored RLF report information is, for example, the stored RLF report information an NR RLF report in the present embodiment.

The above RLF report information is the NR RLF report, which is in the format and encoding of the NR RRC.

Step 702: The UE re-establishes the RRC connection in a cell of the ng-eNB1 or the eNB1. The UE may re-establish the RRC connection through the RRC connection establishment or RRC connection re-establishment procedure. In the RRC connection establishment completion or RRC connection re-establishment completion message, the UE indicates, to the network, that the RLF report information is available. The UE may indicate, to the network, that the RLF report information is available. The UE may also indicate, to the network, that the RLF report information of which radio access technology is available, for example, the UE indicates, to the network, that the NR RLF report is available in the present embodiment.

Through the RRC connection establishment completion or RRC connection re-establishment completion of the LTE RRC message, the UE indicates, to the ng-eNB1 or the eNB1, the RLF report or the NR RLF report information is available. The RLF report is the NR RLF report.

The method of the present disclosure may further include the step of: broadcasting, by the base station, whether the base station supports the RLF information reporting, or broadcasting, by the base station, the RLF information reporting of which radio access technology the base station supports. For example, the ng-eNB1 or the eNB1 broadcasts whether the ng-eNB1 or the eNB1 supports the LTE RLF information reporting and/or the NR RLF information reporting. If the ng-eNB1 or the eNB1 supports the RLF information reporting, or the RLF information reporting of the corresponding radio access technology stored by the TE, the UE transmits, to the re-accessed ng-eNB1 or eNB1, the RLF information reporting or the RLF information reporting of the corresponding radio access technology is available. For example, the ng-eNB1 or the eNB1 broadcasts that ng-eNB1 or the eNB1 supports the NR RLF information reporting, and the UE stores the NR RLF report, thus the TE may indicate, to the ng-eNB1 or the eNB1, the NR RLF information reporting is available.

Step 703: The ng-eNB1 or the eNB1 requests the UE to report the RLF report, and the UE transmits the UE RLF report to the ng-eNB1 or the eNB1.

The ng-eNB1 or the eNB1 requests the UE to report the RLF report according to the RLF report being available indicated by the UE in the RRC connection establishment completion or RRC connection re-establishment completion message.

The ng-eNB1 or the eNB1 may also indicate, to the UE, the NR RLF report is requested. The ng-eNB1 or the eNB1 requests the UE to report the NR RLF report according to the NR RLF report being available indicated by the UE in the RRC connection establishment completion or RRC connection re-establishment completion message. For example, if the UE indicates the NR RLF report, and the ng-eNB1 or the eNB1 supports the request for the NR RLF report, the ng-eNB1 or the eNB1 may request the UE to report the NR RLF report.

The base station may request the UE RLF report through a UE information request message. The UE information request may include the RLF report of which radio access technology is requested, for example, the NR RLF report is requested or the LTE RLF report is requested.

The UE may transmit the RLF report to the base station through a UE information response message. The UE information response message includes the RLF report. The RLF report may be the LTE RLF report and/or the NR RLF report.

The UE RLF report includes the content described in step 701. For the UE, in the UE RLF report, the cell identity of the cell that last serves the UE before the failure occurs is included. Meanwhile, in the LTE RRC message of transmitting the UE RLF report (outside the UE RLF report container), the cell identity of the cell that last serves the UE before the failure occurs is also included. The cell that last serves the UE prior to the failure is also the cell where the failure occurs. For the handover failure, the cell is a target cell of a target base station. All the cell identities may be the global cell identity or the PCI and frequency information. In the present embodiment, the cell is cell A.

In the UE RLF report, the TAC or TAI of the cell that last serves the UE before the failure occurs is included. In the LTE RRC message of transmitting the UE RLF report (outside the UE RLF report container), the TAC or TAI of the cell that last serves the UE before the failure occurs is also included. The cell that last serves the UE prior to the failure is also the cell where the failure occurs. For handover failure, the cell is the target cell of the target base station. In the present embodiment, the cell is cell A.

The NR RLF report information is included in the LTE RRC message by the UE, and cell identity of the cell that last serves the UE before the failure occurs and/or the TAC or TAI of the cell are also included in the LTE RRC message (outside the NR RLF report container) by the UE.

Step 704: The ng-eNB1 or the eNB1 knows the cell that last serves the UE prior to the failure according to the cell identity of the cell that last serves the UE before the failure occurs included in the LTE RRC message, and thus knows the base station which controls this cell. Here, the cell that last serves the UE prior to the failure is controlled by the gNB1.

If there is no Xn interface between the gNB1 and the ng-eNB1 or there is no interface between the gNB1 and the eNB1, the ng-eNB1 or the eNB1 needs to transmit the RLF report received from the UE to the gNB1 through the core network.

The ng-eNB1 transmits an uplink RAN configuration transfer of an NG Application Protocol (AP) message to the AMF. Here, other NGAP messages are possible to be used. The eNB1 transmits an eNB configuration transfer of the S1AP message to the MME. Here, other S1AP messages are possible to be used. The message includes the TAI of the cell in which the failure occurs and/or the base station identity of the base station which controls the cell in which the failure occurs. The ng-eNB1 or the eNB1 sets the identity of the target base station in the message as the base station identity of the base station which controls the cell where the failure occurs. The ng-eNB1 or the eNB1 knows the TAI of the cell in which the failure occurs according to the cell identity and the TAC or TAI of the cell where the failure occurs received from the LTE RRC message. The ng-eNB1 or the eNB1 knows the base station identity of the base station which controls the cell where the failure occurs according to the cell identity of the cell where the failure occurs received from the LTE RRC message, that is, the base station identity of the gNB1.

The TAI is used for routing in the core network. For example, the AMF entity to which the ng-eNB1 is connected uses the TAI to find the AMF entity to which the gNB1 is connected, and forwards the information in the uplink RAN configuration transfer message to the AMF to which the gNB1 is connected. The gNB1 and ng-eNB1 may be connected to the same AMF or different AMFs, and the AMF entity to which the ng-eNB1 is connected knows whether the gNB1 and ng-eNB are connected to the same AMF, according to the TAI. Alternatively, the MME to which the eNB1 is connected uses the TAI to find the AMF entity to which the gNB1 is connected, and forwards the eNB configuration transfer message to the AMF to which the gNB1 is connected.

The identity of the base station which controls the cell where the failure occurs is used for the core network to transmit a downlink RAN configuration transfer message to the gNB1, otherwise the AMF does not know to which base station the message may be transmitted.

The ng-eNB1 or the eNB1 does not need to decode the RLF report container of the NR. This method may simplify the base station.

The ng-eNB1 or the eNB1 knows the cell that last serves the UE prior to the failure directly according to the cell identity of the cell that last serves the UE before the failure occurs included in the LTE RRC message, and thus knows the base station which controls the cell, and transmits a failure indication message to the base station. The ng-eNB1 or the eNB1 may transmit a failure indication message to the base station which controls the cell that last serves the UE prior to the failure, without a support for implementing the RRC of the NR. Similarly, in the case where there is no Xn interface between the ng-eNB1 and the gNB1 or there is no interface between the eNB1 and the gNB1, the ng-eNB1 or the eNB1 does not need to decode the content of the NR RLF report, and may know the TAI of the cell where the failure occurs directly from the LTE RRC message, and know the base station identity of the base station which controls the cell where the failure occurs according to the cell identity of the cell where the failure occurs, so as to transmit the RLF report to the gNB1 through the core network. Meanwhile, the UE does not need to wait to transmit the UE RLF report until the UE reconnects to the NR base station, which reduces the time for the UE to store the RLF report and stores the UE's memory space. Similarly, in the case where there is no Xn interface between the ng-eNB1 and the gNB1 or there is no interface between the eNB1 and the gNB1, the ng-eNB1 or the eNB1 does not need to decode the content of the NR RLF report, and may know the TAI of the cell where the failure occurs and/or the base station identity of the base station which controls the cell where the failure occurs directly from the LTE RRC message, so as to transmit the RLF report to the gNB1 through the core network.

Step 705: The AMF transmits a downlink RAN configuration transfer of the NGAP message to the gNB1. Here, other NGAP messages are possible to be used. The AMF knows the base station to which the message is to be transmitted according to the identity of the target base station.

Step 706: The gNB1 detects the cause of the failure occurring, such as too early handover, too late handover, or handover to wrong cell. The gNB1 may detect the cause of the failure occurring according to the existing mechanism, and details are not described herein repeatedly.

For too early handover or handover to wrong cell, the gNB1 transmits a handover report message to the base station which controls the source cell that triggers the last handover, such as the ng-eNB or the eNB1 or the gNB. The gNB1 knows the identity of the source cell that triggers the last handover according to the UE RLF report, and may thus know the base station identity of the base station which controls the source cell that triggers the last handover. The handover report message includes the cell identity of the cell where the UE attempts to establish the RRC connection, or the cell identity of the cell where the UE establishes the RRC connection, after the failure. Optionally, the handover report message may include the cell identity of the target cell for the handover. If the base station that triggers the last handover is not a base station supporting the NR access technology (e.g., the eNB or the ng-eNB), the handover report may not include the UE RLF report. The handover report message directly includes a combination of one or more of information as described in step 305. In this way, the eNB or the ng-eNB may know more information about the failure without parsing the NR RRC information, so as to confirm the cause of the failure and make reasonable parameter adjustments to avoid future failures. The gNB1 obtains the one or more information described in step 305 from the UE RLF report, and the gNB1 makes one or more of the information directly included in the handover report message, and sends the handover report message to the base station which controls the source cell that triggers the last handover. The gNB1 may makes one or more of the above information included in the handover report message in the case where the base station that triggers the last handover is not a base station that supports the NR radio access technology. In this way, the base station that triggers the last handover may determine the cause of the failure and make reasonable parameter adjustments to avoid future failures, without parsing the content in the UE RLF report in different radio access technologies.

If there is no Xn interface or no interface between the gNB1 and the base station which controls the source cell that triggers the last handover, the handover report needs to be transmitted through the core network to the base station, the ng-eNB or the eNB1 or the gNB, which controls the source cell that triggers the last handover.

The gNB1 transmits an uplink RAN configuration transfer of the NGAP message to the AMF. The TAI included in the message is set as the TAI of the source cell that triggers the last handover. The target base station identity is set as the base station identity of the base station which controls the source cell that triggers the last handover. The message includes information about the too early handover or handover to wrong cell. The message may also be other NGAP messages. The gNB1 knows the TAI of the source cell that triggers the last handover according to the UE RLF report, and knows the base station identity of the base station which controls the source cell that triggers the last handover according to the cell identity of the source cell that triggers the last handover.

Step 707: The AMF transmits a downlink RAN configuration transfer of the NGAP message to the ng-eNB or the gNB. For the case where the base station that last triggers the handover is an LTE base station eNB, the MME transmits an MME configuration transfer of the S1AP message to the eNB. Here, other S1AP messages are possible to be used. The MME knows which base station the message is to be transmitted to, according to the target base station identity. The detailed description of the procedure between the AMF and the MME is omitted here.

So far, the description of the second embodiment of the first method for supporting self-configuration and self-optimisation of the present disclosure is completed. This method may enable the network to correctly detect the cause of the failure in the case that the UE fails when moving between different RATs, while reducing the time for the UE to store RLF report information and reducing the process on the base station side, that is, the NR base station does not need to decode the content of the LTE RRC and the LTE base station does not need to decode the content of the NR RRC. When there is no Xn interface between the base station which controls the cell where the failure occurs and the base station which controls the cell where the UE reconnects, the LTE base station may still transmit the RLF report to the base station which controls the cell where the failure occurs through the core network without parsing the NR RLF. When there is no Xn interface between the base station which controls the cell where the failure occurs and the base station which controls the cell that triggers the last handover, the base station which controls the cell where the failure occurs may still transmit a handover report to the base station which controls the source cell that triggers the last handover.

Figure 8:
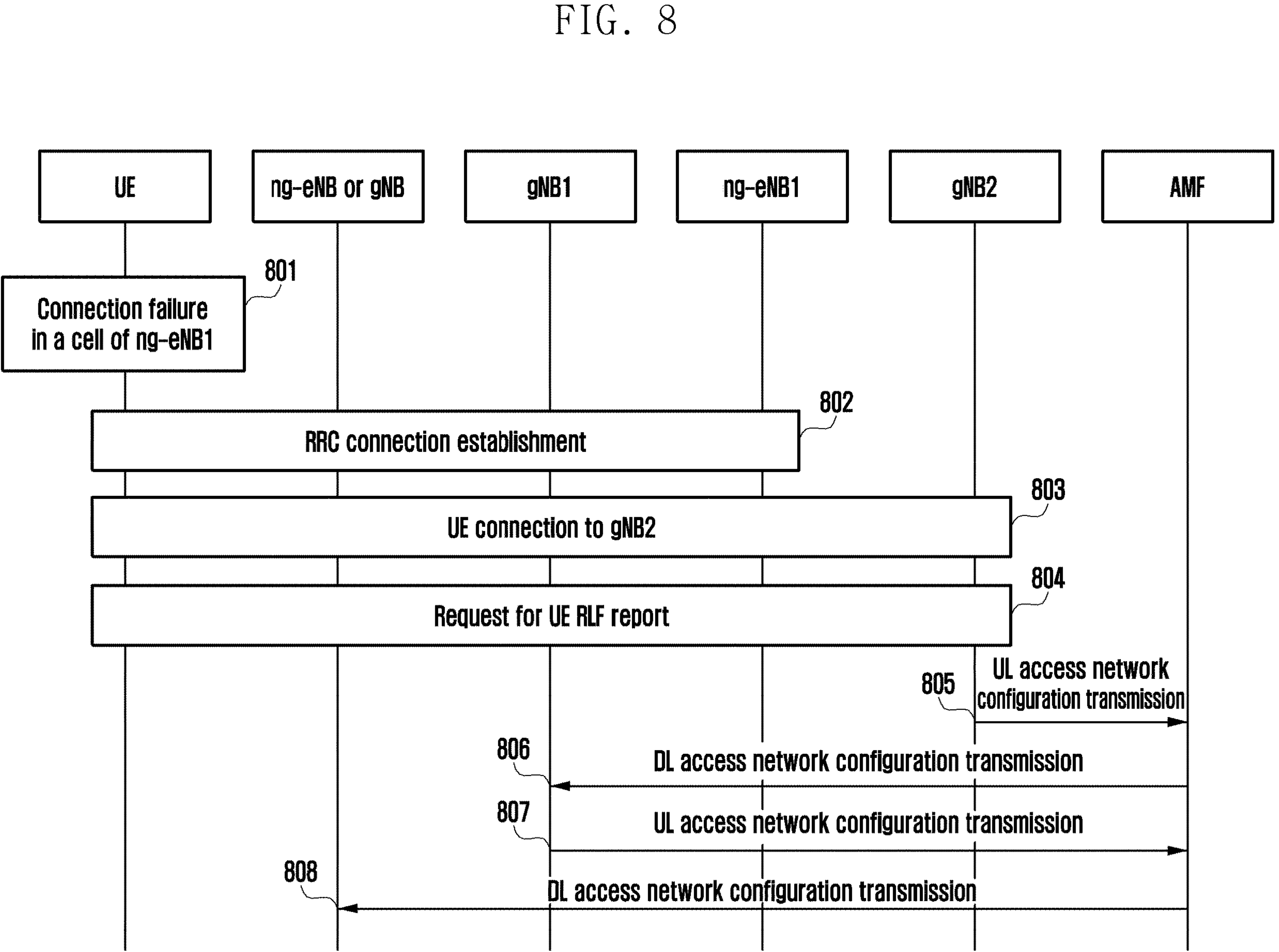
FIG. 8 illustrates a first embodiment of the third method for supporting self-configuration and self-optimisation according to the present disclosure.

A first embodiment of the third method for supporting self-configuration and self-optimisation according to the present disclosure is illustrated in FIG. 8. A detailed description of steps which are not related to the present disclosure is omitted here. This embodiment is illustrated by taking an example in which the failure occurs in an NR base station gNB, and the base station that the UE re-accesses after the failure is an LTE base station ng-eNB. Conversely, this method may be applicable as well, for example, the failure occurs in the LTE base station, the ng-eNB, and the base station that the UE re-accesses after the failure is the NR base station gNB.

The method includes steps as follows.

Step 801: A UE fails in a cell of the gNB1, and it is assumed that the LE fails in cell A. Herein, the failure may be an RLF or a handover failure. For the handover failure, the cell A is a target cell for the handover. The cell where the failure occurs is also the cell that last serves the LE prior to the failure. The UE stores one or more of the following information:

Cell identity of the cell A, which may be a global cell identity or a physical cell identifier (PCI) and frequency information;

Tracking area code (TAC) or tracking area identity (TAI) of the cell A;

Cell identity of the source cell that triggers the last handover;

Cell identity of the source cell that triggers the last handover;

Time elapsed from the beginning of the last handover to the failure;

Connection failure being an RLF or a handover failure;

Radio measurements of the UE;

C-RNTI allocated to the UE by the cell that last serves the UE prior to the failure;

Cause of triggering an RLF;

Cell identity of the cell where the UE attempts to re-establish the RRC connection after the failure;

Cell identity of the cell where the UE successfully establishes the RRC connection, or cell identity of the cell where the UE attempts to establish the RRC connection, after the failure;

Time elapsed from the failure to the UE R LF report;

Time elapsed from the failure to the RRC re-connection attempt or successful access to the network. The RRC re-connection attempt refers to transmission of an RRC connection establishment request or RRC connection re-establishment request message. The successful access to the network may be that the UE transmits the RRC connection establishment completion or RRC connection re-establishment completion or RACH success.

The last four items may be stored in a subsequent procedure. For example, when the UE attempts to re-establish the RRC connection, the UE records the cell identity of the cell where the UE attempts to re-establish the RRC connection after the failure. When the UE successfully re-establishes the RRC connection or the UE attempts to establish the RRC connection, the UE records the cell identity of the cell where the UE successfully establishes the RRC connection or the cell identity of the cell where the UE attempts to establish the RRC connection. When the UE prepares to transmit the RLF report, the UE records the time elapsed from the failure to the UE RLF report. Upon successful access to the network, the UE records the time elapsed from the failure to successful access to the network.

All the above cell identities may be the global cell identity or the PCI and the frequency information.

The UE also stores the RLF report of which radio access technology the stored RLF report information is, such as an LTE RLF report or an NR RLF report.

The above-mentioned RLF report information is an NR RLF report, which is in a format and encoding of the NR RRC.

Step 802: The UE re-establishes the RRC connection in the cell of the ng-eNB1 or the eNB1. The UE may re-establish the RRC connection through the RRC connection establishment or RRC connection re-establishment procedure. In the RRC connection establishment completion or RRC connection re-establishment completion message, the UE indicates, to the network, that the RLF report information is available.

Step 803: the UE is connected to the gNB2. The UE may access the gNB2 through RRC connection establishment or RRC connection re-establishment or handover. In the RRC connection establishment completion or RRC connection re-establishment completion or RRC reconfiguration completion message, the UE indicates, to the network, the RLF report information is available. The RRC reconfiguration completion message is used to indicate that the handover completion. The UE may also indicate, to the network, the RLF report information of which radio access technology is available, for example, in the present embodiment, the UE indicates to the network the NR RLF report is available.

The method of the present disclosure may further include the step of broadcasting, by the base station, whether the base station supports the RLF information reporting. If the base station with which the UE re-establishes the RRC connection supports the RLF information reporting, the UE transmits, to the re-accessed base station, the RLF information reporting is available. For example, the gNB2 broadcasts whether the gNB2 supports the RLF information reporting, the UE re-accesses the gNB2, and the UE may indicate, to the gNB2, the RLF information report is available.

The UE stores that the RLF report information is the RLF report of which radio access technology, for example, the UE stores the NR RLF report, and when the UE re-accesses the NR base station, the UE indicates, to the gNB2, the RLF report information is available.

Step 804: The gNB2 requests the UE to report the RLF report, and the UE transmits a UE RLF report to gNB2.

Step 805: The UE RLF report includes the content described in step 801. The gNB2 knows the base station gNB1 which controls the cell where the failure occurs, according to the cell identity of the cell that last serves the UE before the failure occurs included in the UE RLF report. The gNB2 transmits a failure indication message to the gNB1. The failure indication message includes the RLF report received from the UE.

If there is no Xn interface between the gNB2 and the gNB1, the gNB2 needs to transmit the RLF report to the gNB1 through the core network.

The gNB2 transmits an uplink RAN configuration transfer of an NGAP message to the AMF. Here, other NGAP messages are possible to be used. The message includes the UE RLF report, the TAI of the cell where the failure occurs and the base station identity of the base station which controls the cell where the failure occurs. The gNB3 sets the identity of the target base station in the message as the base station identity of the base station which controls the cell where the failure occurs. The gNB3 sets the target TAI in the message as the TAI of the cell where the failure occurs. The gNB2 knows the TAI of the cell where the failure occurs from the cell identity and the TAC or TAI of the cell where the failure occurs included in the UE RLF report. The gNB2 knows the base station identity of the base station which controls the cell where the failure occurs, from the cell identity of the failed cell included in the UE RLF report. The TAI is used for routing in the core network, for example, the core network entity (such as AMF2) to which the gNB2 is connected finds the core network entity (such as AMF1) to which the gNB1 is connected. The gNB1 and the gNB2 may also be connected to the same AMF. That is, AMF1 and AMF2 may be the same AMF or different AMFs. The base station identity is used for the AMF to forward the UE RLF report to the base station gNB1 of the cell where the failure occurs.

Step 806: The AMF transmits a downlink RAN configuration transfer of the NGAP message to the gNB1. Here, other NGAP messages are possible to be used. The message includes the UE RLF report. The AMF knows which base station the message is to be transmitted to, according to the identity of the target base station.

Step 807: The gNB1 detects the cause of the failure occurring, such as too early handover, too late handover, or handover to wrong cell. The gNB1 knows the right cell to which the UE may be handed over according to the cell identity of cell where the UE successfully establishes the RRC connection or the cell identity of cell where the UE attempts to establish the RRC connection, after the failure. For the too late handover, the failed cell may handover the UE to the cell where the UE successfully establishes the RRC connection or the cell where the UE attempts to establish the RRC connection. For the too early handover or the handover to wrong cell, the source cell that triggers the last handover may handover the UE to the cell where the UE attempts to establish the RRC connection or the cell where the UE successfully establishes the RRC connection. The gNB1 may also determine whether the cell where the LE attempts to establish the RRC connection or the cell where the UE successfully establishes the RRC connection after the failure is a suitable handover cell of the handover according to the time elapsed from the failure to the RRC re-connection attempt or the successful access to the network.

For the too early handover or the handover to wrong cell, the gNB1 transmits a handover report message to the base station which controls the source cell that triggers the last handover, such as the ng-eNB or the eNB or the gNB. The gNB1 knows the identity of the source cell that triggers the last handover according to the UE RLF report, and thus may know the identity of the base station which controls the source cell that triggers the last handover. The handover report message includes the cell identity of the cell where the UE attempts to establish the RRC connection or the cell identity of the cell where the UE establishes the RRC connection, after the failure. Optionally, the handover report message may include the cell identity of the target cell for the handover. If the base station that triggers the last handover is not a base station that supports the NR access technology (for example, the eNB or the ng-eNB), the handover report may not include the UE RLF report. The handover report message directly includes a combination of one or more of the information described in step 305. In this way, the eNB or the ng-eNB may know more information about the failure without parsing the NR RRC information, so as to confirm the cause of the failure and make reasonable parameter adjustments to avoid future failures. The gNB1 obtains the one or more information described in step 305 from the UE RLF report, and the gNB1 makes one or more of the information directly included in the handover report message, and sends the handover report message to the base station which controls the source cell that triggers the last handover. The gNB1 may makes one or more of the above information included in the handover report message in the case where the base station that triggers the last handover is not a base station that supports the NR radio access technology. In this way, the base station that triggers the last handover may determine the cause of the failure and make reasonable parameter adjustments to avoid future failures, without parsing the content in the UE RLF report of different radio access technologies.

If there is no interface between the gNB1 and the base station which controls the source cell that triggers the last handover, the handover report needs to be transmitted through the core network to the base station, the ng-eNB or the eNB or the gNB, which controls the source cell that triggers the last handover.

The gNB1 transmits an uplink RAN configuration transfer of the NGAP message to the AMF. The TAI included in the message is set as the TAI of the source cell that triggers the last handover. The target base station identity is set as the identity of the base station which controls the source cell that triggers the last handover. The message includes information about the too early handover or the handover to wrong cell. The message may also be other NGAP messages. The gNB1 knows the TAI of the source cell that triggers the last handover according to the UE RLF report, and knows the identity of the base station which controls the source cell that triggers the last handover according to the cell identity of the source cell that triggers the last handover.

Step 808: The AMF transmits a downlink RAN configuration transfer of the NGAP message to the ng-eNB or the gNB. For the case where the base station that last triggers the handover is an LTE base station eNB, the MME transmits an MME configuration transfer of the S1AP message to the eNB. Here, other S1AP messages are possible to be used. The MME knows which base station the message is to be transmitted to, according to the target base station identity. The detailed description of the procedure between the AMF and the MME is omitted here.

So far, the description of the embodiment of the third method for supporting self-configuration and self-optimisation of the present disclosure is completed. This method may enable the network to correctly detect the cause of the failure in the case that the UE fails when moving between different RATs, while reducing the process on the base station side, that is, the NR base station does not need to decode the content of the LTE RRC and the LTE base station does not need to decode the content of the NR RRC. When there is no Xn interface between the base station which controls the cell where the failure occurs and the base station which controls the cell where the UE reconnects, the NR base station may still transmit the RLF report to the base station which controls the cell where the failure occurs through the core network without parsing the NR RLF. When there is no Xn interface between the base station which controls the cell where the failure occurs and the base station which controls the cell that triggers the last handover, the base station of the cell where the failure occurs may still transmit the handover report to the base station which controls the source cell that triggers the last handover.

So far, the description of the method for supporting self-configuration and self-optimisation of the present disclosure is completed. This method may enable the network to correctly detect the cause of the failure in the case that the UE fails when moving between different RATs, while reducing the time for the UE to store RLF report information and reducing the process on the base station side, that is, the NR base station does not need to decode the content of the LTE RRC and the LTE base station does not need to decode the content of the NR RRC. When there is no Xn interface between the base station which controls the cell where the failure occurs and the base station which controls the cell where the UE reconnects, the base station may still transmit the RLF report to the base station which controls the cell where the failure occurs through the core network without parsing the RLF of other radio access technologies. When there is no Xn interface between the base station which controls the cell where the failure occurs and the base station which controls the cell that triggers the last handover, the base station of the cell where the failure occurs may still transmit a handover report to the base station which controls the source cell that triggers the last handover.

Figure 9:
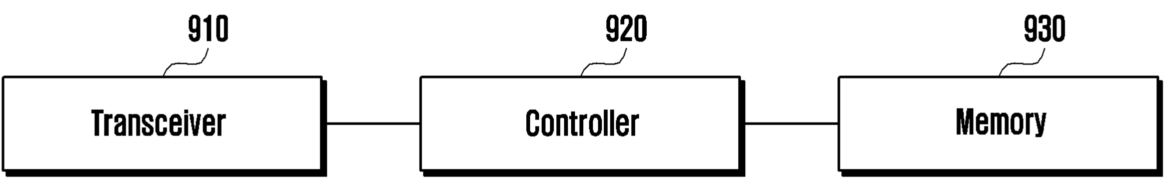
FIG. 9 is a block diagram of a terminal according to an embodiment of the present disclosure.

FIG. 9 is a block diagram of a terminal according to an embodiment of the present disclosure.

Referring to FIG. 9, the terminal includes a transceiver 910, a controller 920, and a memory 930. The transceiver 910, the controller 920, and the memory 930 are configured to perform operations of the UE shown in FIGS. 3 to 8 or described above. Although the transceiver 910, the controller 920, and the memory 930 are shown as separate entities, the transceiver 910, the controller 920, and the memory 930 may be implemented as a single entity, such as a single chip. The transceiver 910, the controller 920, and the memory 930 may be electrically connected or coupled to each other. The transceiver 910 may transmit signals to and receive signals from other network entities, such as a base station. The controller 920 may control the UE to perform a function according to one of the above embodiments. For example, the controller 920 is configured to store, by the UE, information about the failure when the UE fails in a first cell; establish, by the UE, a connection with a second base station of a second cell; receive, by the UE, a request message for reporting a failure report from the second base station; and transmit, by the UE, to the second base station a message about the failure report, the message about the failure report includes a UE RLF report container, and the UE RLF report container includes identity information about the cell where the failure occurs and/or information of tracking area of the cell where the failure occurs.

Figure 10:
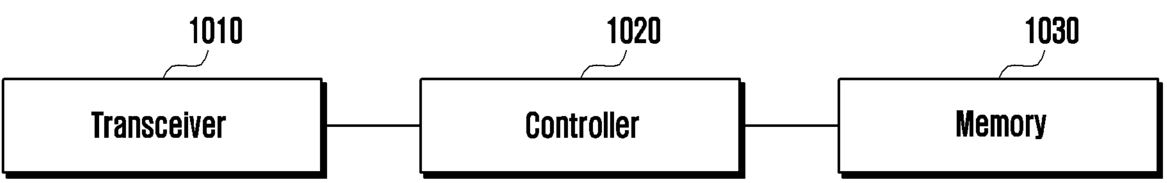
FIG. 10 is a block diagram of a base station according to an embodiment of the present disclosure.

FIG. 10 is a block diagram of a base station according to an embodiment of the present disclosure.

Referring to FIG. 10, the base station includes a transceiver 1010, a controller 1020, and a memory 1030. The transceiver 1010, the controller 1020, and the memory 1030 are configured to perform operations of the network base station shown in FIGS. 3 to 8 or described above. Although the transceiver 1010, the controller 1020, and the memory 1030 are shown as separate entities, the transceiver 1010, the controller 1020, and the memory 1030 may be implemented as a single entity, such as a single chip. The transceiver 1010, the controller 1020, and the memory 1030 may be electrically connected or coupled to each other. The transceiver 1010 may transmit signals to and receive signals from other network entities, such as a UE. The controller 1020 may control the base station to perform a function according to one of the above embodiments. For example, the controller 1020 is configured to establish, by a second base station of a second cell, a connection with the terminal after the UE fails in a first cell; transmits, by the second base station, to the UE a request message of reporting the failure report, the request message includes information about the failure stored by the terminal; receive, by the second base station, a message about the failure report from the UE, the message about the failure report includes a UE RLF report container, the UE RLF report container includes identity information about the cell where the failure occurs and/or information of tracking area of the cell where the failure occurs.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:

identifying a handover failure in a first cell of a first base station operating with a new radio (NR) radio access technology (RAT);

performing a first radio resource control (RRC) connection establishment with a second cell of a second base station operating with a long term evolution (LTE) RAT;

setting, in a connection failure report, a value of time elapsed between the handover failure and the first RRC connection establishment, and an identity of the second cell;

performing a second RRC connection establishment with a third cell of a third base station operating with the NR RAT;

receiving, from the third base station, a first message requesting the connection failure report; and transmitting, to the third base station, a second message including the connection failure report.

2. The method of claim 1, wherein the identity of the second cell is set based on a global cell identity.

3. The method of claim 1, further comprising:

based on identifying the handover failure, setting, in the connection failure report, at least one of:

a connection failure type indicating the handover failure, information for identifying the first cell, information for identifying a source cell that triggers associated with a last handover being failed, or a value of time elapsed between since an initialization of the last handover until the handover failure.

4. The method of claim 1, wherein further comprising:

before transmitting the second message, setting, in the connection failure report, a value of time elapsed since the handover failure.

5. The method of claim 1, wherein the connection failure report is delivered to the first base station.

6. A method performed by a base station operating with a new radio (NR) radio access technology (RAT) in a wireless communication system, the method comprising:

performing a radio resource control (RRC) connection establishment with a terminal;

transmitting, to the terminal, a first message requesting a connection failure report; and receiving, from the terminal, a second message including the connection failure report, wherein the connection failure report includes:

a value of time elapsed between a handover failure and a next time the terminal connects to a long term evolution (LTE) cell, and an identity of the LTE cell.

7. The method of claim 6, wherein the identity of the LTE cell is set based on a global cell identity.

8. The method of claim 6, wherein the connection failure report further includes at least one of:

a connection failure type indicating the handover failure, information for identifying a cell in which the handover failure occurs, information for identifying a source cell that triggers associated with a last handover being failed, or a value of time elapsed between since an initialization of the last handover until the handover failure.

9. The method of claim 6, wherein the connection failure report further includes a value of time elapsed from the handover failure until the terminal transmits the second message.

10. The method of claim 6, further comprising:

transmitting, to another base station operating a cell in which the handover failure occurs, the connection failure report.

11. A terminal in a wireless communication system, the terminal comprising:

a transceiver; and a controller coupled with the transceiver and configured to:

identify a handover failure in a first cell of a first base station operating with a new radio (NR) radio access technology (RAT), perform a first radio resource control (RRC) connection establishment with a second cell of a second base station operating with a long term evolution (LTE) RAT, set, in a connection failure report, a value of time elapsed between the handover failure and the first RRC connection establishment, and an identity of the second cell, perform a second RRC connection establishment with a third cell of a third base station operating with the NR RAT, receive, from the third base station, a first message requesting the connection failure report, and transmit, to the third base station, a second message including the connection failure report.

12. The terminal of claim 11, wherein the identity of the second cell is set based on a global cell identity.

13. The terminal of claim 11, wherein the controller is further configured to:

based on identifying the handover failure, set, in the connection failure report, at least one of:

a connection failure type indicating the handover failure, information for identifying the first cell, information for identifying a source cell that triggers associated with a last handover being failed, or a value of time elapsed between since an initialization of the last handover until the handover failure.

14. The terminal of claim 11, wherein the controller is further configured to:

before transmitting the second message, set, in the connection failure report, a value of time elapsed since the handover failure.

15. The terminal of claim 11, wherein the connection failure report is delivered to the first base station.

16. A base station operating with a new radio (NR) radio access technology (RAT) in a wireless communication system, the base station comprising:

a transceiver; and a controller coupled with the transceiver and configured to:

perform a radio resource control (RRC) connection establishment with a terminal, transmit, to the terminal, a first message requesting a connection failure report, and receive, from the terminal, a second message including the connection failure report, wherein the connection failure report includes:

a value of time elapsed between a handover failure and a next time the terminal connects to a long term evolution (LTE) cell, and an identity of the LTE cell.

17. The terminal base station of claim 16, wherein the identity of the LTE cell is set based on a global cell identity.

18. The terminal base station of claim 16, wherein the connection failure report further includes at least one of:

a connection failure type indicating the handover failure, information for identifying a cell in which the handover failure occurs, information for identifying a source cell that triggers associated with a last handover being failed, or a value of time elapsed between since an initialization of the last handover until the handover failure.

19. The terminal base station of claim 16, wherein the connection failure report further includes a value of time elapsed from the handover failure until the terminal transmits the second message.

20. The terminal base station of claim 16, wherein the controller is further configured to:

transmit, to another base station operating a cell in which the handover failure occurs, the connection failure report.

* * * * *